US012254816B2

(12) United States Patent
Halbritter et al.

(10) Patent No.: US 12,254,816 B2
(45) Date of Patent: Mar. 18, 2025

(54) PICTURE ELEMENT FOR A DISPLAY DEVICE AND DISPLAY DEVICE

(71) Applicant: OSRAM Opto Semiconductors GmbH, Regensburg (DE)

(72) Inventors: Hubert Halbritter, Dietfurt (DE); Jens Richter, Hemau (DE); Kilian Regau, Regensburg (DE); Patrick Hörner, Regensburg (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 0 days.

(21) Appl. No.: 17/791,875

(22) PCT Filed: Dec. 14, 2020

(86) PCT No.: PCT/EP2020/086001
§ 371 (c)(1),
(2) Date: Jul. 8, 2022

(87) PCT Pub. No.: WO2021/139967
PCT Pub. Date: Jul. 15, 2021

(65) Prior Publication Data

US 2023/0092321 A1 Mar. 23, 2023

(30) Foreign Application Priority Data

Jan. 9, 2020 (DE) ..................... 10 2020 100 335.8

(51) Int. Cl.
*G09G 3/32* (2016.01)
*G09G 3/3258* (2016.01)

(52) U.S. Cl.
CPC ............. *G09G 3/32* (2013.01); *G09G 3/3258* (2013.01); *G09G 2300/0828* (2013.01);
(Continued)

(58) Field of Classification Search
CPC .................. G09G 3/32; G09G 3/3258; G09G 2300/0861; G09G 2300/0828;
(Continued)

(56) References Cited

U.S. PATENT DOCUMENTS 7,750,900 B2 * 7/2010 Tsuchi ................ G09G 3/3688 345/204
8,558,852 B2 * 10/2013 Maki .................... G09G 3/3688 345/98
(Continued)

FOREIGN PATENT DOCUMENTS

CN 106716517 A 5/2017
DE 10 297 529 T5 3/2005
(Continued)

OTHER PUBLICATIONS

International Search Report issued for corresponding International Patent Application No. PCT/EP2020/086001 on May 11, 2021, along with an English translation (10 pages).
(Continued)

*Primary Examiner* — Jason M Mandeville
(74) *Attorney, Agent, or Firm* — HAUPTMAN HAM, LLP

(57) ABSTRACT

A picture element for a display device includes a first and a second supply connection, a light-emitting semiconductor device arranged between the first and the second supply terminal, and a comparison unit having a first and a second input and an output. The comparison unit is configured to adjust a voltage at the output in dependence on a comparison of a voltage applied to the first input and a voltage applied to the second input. The picture element also includes a supply switch-configured to control a current flow between the first and the second supply terminal via the light-emitting semiconductor device depending on the voltage applied at the output of the comparison unit. The picture element
(Continued)

Figure 1:
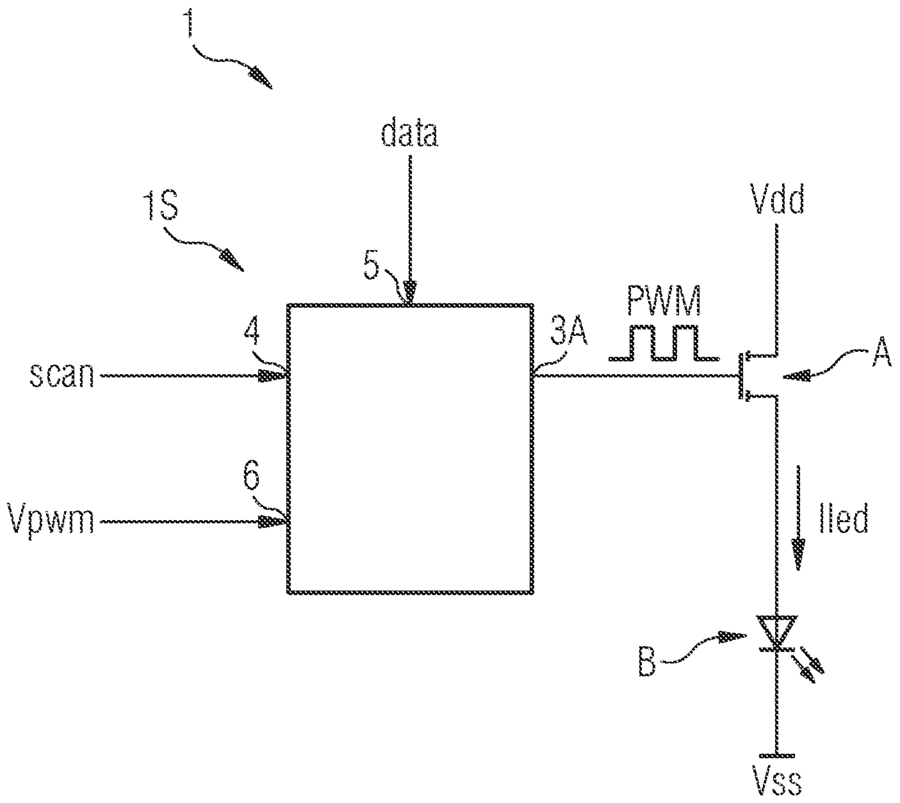

further includes a selection input, a data input, a memory element and a control switch.

17 Claims, 11 Drawing Sheets

(52) U.S. Cl.
CPC ............... *G09G 2300/0852* (2013.01); *G09G 2300/0861* (2013.01); *G09G 2310/0259* (2013.01); *G09G 2310/066* (2013.01); *G09G 2320/0626* (2013.01); *G09G 2320/0693* (2013.01); *G09G 2360/10* (2013.01)

(58) Field of Classification Search
CPC ... G09G 2300/0852; G09G 2310/0259; G09G 2310/066; G09G 2320/0626; G09G 2320/0693; G09G 2360/10
USPC .................................................... 345/690, 76
See application file for complete search history.

(56) References Cited

U.S. PATENT DOCUMENTS

| | | | | |
|---|---|---|---|---|
| 11,222,583 | B2 * | 1/2022 | Takahashi | G09G 3/32 |
| 2004/0145547 | A1 | 7/2004 | Oh | |
| 2005/0067968 | A1 | 3/2005 | Yamashita | |
| 2005/0156828 | A1 * | 7/2005 | Yamashita | G09G 3/3258 345/76 |
| 2006/0125739 | A1 | 6/2006 | Tsutsui | |
| 2007/0216633 | A1 * | 9/2007 | Kim | G09G 3/2011 345/100 |
| 2008/0297390 | A1 * | 12/2008 | Ko | G09G 3/3685 341/144 |
| 2010/0289424 | A1 | 11/2010 | Chang et al. | |
| 2014/0292745 | A1 * | 10/2014 | Kikuchi | G09G 3/3258 345/82 |
| 2015/0223299 | A1 | 8/2015 | Stockstad et al. | |
| 2017/0206845 | A1 | 7/2017 | Sakariya et al. | |

FOREIGN PATENT DOCUMENTS

| | | | |
|---|---|---|---|
| EP | 0 731 440 | B1 | 8/2002 |
| JP | 2003-99007 | A | 4/2003 |
| JP | 2003-241711 | A | 8/2003 |
| JP | 2005-130432 | A | 5/2005 |
| JP | 2006-126779 | A | 5/2006 |
| JP | 2011-81267 | A | 4/2011 |
| JP | 2014-98736 | A | 5/2014 |
| JP | 2016-109914 | A | 6/2016 |

OTHER PUBLICATIONS

Written Opinion issued for corresponding International Patent Application No. PCT/EP2020/086001 on May 11, 2021 (14 pages).

* cited by examiner

PICTURE ELEMENT FOR A DISPLAY DEVICE AND DISPLAY DEVICE

CROSS REFERENCE TO RELATED APPLICATION

This application is a National Stage of International Application No. PCT/EP2020/086001, filed on Dec. 14, 2020, which designates the United States and was published in Europe, and which claims priority to German Patent Application No. 10 2020 100 335.8, filed on Jan. 9, 2020, in the German Patent Office. Both of the aforementioned applications are hereby incorporated by reference in their entireties.

The invention relates to a picture element and a display device having a plurality of picture elements.

Conventional controls for pixels of a display device work in a cross-matrix arrangement and use the reduction of the current (so-called current dimming) to influence the brightness by changing the intensity of the emitted light of the pixels. This is also known as analog dimming. It is used for OLEDs and LCDs, for example. Such a control is disadvantageous for LED displays because of the unfavorable influence on the color locus.

The task is to provide a picture element for a display device as well as a display device with an alternative control.

To this end, a picture element and a display device are disclosed according to the independent patent claims.

According to a first aspect, the invention relates to a picture element for a display device. A picture element refers to an electronic sub-unit of the display device which is arranged to display a pixel or a sub-pixel of the display device. In particular, in the case of a polychromatic display device, individual pixels may be formed by a plurality of sub-pixels of different colors, for example by a red sub-pixel, a green sub-pixel and a blue sub-pixel. Such a composite is also referred to below as an RGB triplet.

In one embodiment, the picture element has a first supply connection. This can be, for example, an electrical connection via which a predetermined operating voltage or a predetermined operating current is supplied to the picture element. In addition, the picture element has a second supply connection. The second supply connection is, by way of example, a ground connection. However, the second supply connection can also be an electrical connection for supplying a predetermined operating voltage or a predetermined operating current.

In one embodiment, the picture element has a light-emitting semiconductor device disposed between the first and second supply terminals. The semiconductor device is in particular a light-emitting diode, LED. For the electrical supply, the semiconductor device is coupled to the first and second supply terminals, in particular indirectly. In particular, it is provided that a driver unit is connected upstream of the semiconductor device for each picture element in order to control the current flow.

In one embodiment, the picture element comprises a comparison unit having a first input and a second input as well as an output. The comparison unit is set up to set a voltage at the output of the comparison unit depending on a comparison of a voltage present at the first input of the comparison unit with a voltage present at the second input of the comparison unit. In particular, the comparison unit can comprise or be designed as a comparator or 1-bit analog-to-digital converter for this purpose. In this context, the comparison unit can in particular have further inputs for supply, which are connected, for example, to the first and second supply terminals. The first input is, by way of example, a non-inverting input. The second input is, by way of example, an inverting input. In particular, the comparison unit may be arranged to output at the output the voltage present at the first supply terminal in the event that the voltage present at the first input is greater than the voltage present at the second input, and otherwise to output the voltage present at the second supply terminal.

In one embodiment, the picture element comprises a supply switch arranged to control a current flow between the first and second supply terminals via the light-emitting semiconductor device depending on the voltage applied to the output of the comparison unit. The supply switch is, for example, a transistor. In particular, the supply switch is arranged to allow current flow through the semiconductor device when a predetermined threshold value of the voltage applied to the output of the comparison unit is exceeded and to block it otherwise.

In one embodiment, the picture element includes a selection input and a data input. Signals provided via the selection input may also be referred to as a selection signal, “select” or “scan”; the selection input may be provided for connection to a column line of the display device in this context. Signals provided via the data input may also be referred to as a data signal or “data”; the data input may be provided for connection to a row line of the display device in this context.

In one embodiment, the picture element has a memory element and a control switch. The control switch is set up to feed a data signal provided via the data input to the first input of the comparison unit as a function of a selection signal applied to the selection input and to hold it in the memory element. The selection signal is in particular a predetermined voltage pulse for switching the control switch. The data signal is in particular a predetermined voltage corresponding to a brightness of the semiconductor device in the intended light-emitting operation. The storage element is, for example, a capacitor which is set up to hold an applied voltage for a predetermined period of time, for example for a period of time until a next image is to be displayed on the display device (e.g. reciprocal value of the image repetition frequency of the display device). The control switch is, for example, a transistor. In particular, the control switch is arranged to allow the voltage representing the data signal to be applied to the first input of the comparison unit and to the storage element when a predetermined threshold value of the voltage representing the selection signal applied to the selection input is exceeded, and to inhibit it otherwise. In other words, the storage element and the control switch form a so-called “sample-and-hold” unit.

In one embodiment, the second input of the comparison unit is provided for receiving a ramp signal. For example, the ramp signal can be generated externally with respect to the picture element and provided to the picture element, or it can be generated by an internal circuit in the picture element. In particular, the ramp signal is a predetermined, periodic voltage waveform. Exemplarily, the ramp signal is a saw-tooth signal, in particular with a linearly rising saw-tooth. Alternatively, a periodic increase can also be non-linear, such as logarithmic or exponential. In this context, periodic means that a saw-tooth or ramp-like signal component with a rise and a fall in each case repeats identically or essentially identically within a specified time (period duration).

In particular, the ramp signal is selected in such a way that a comparison with the voltage representing the data signal by the comparison unit at the output of the comparison unit results in a pulse width modulated (PWM) voltage waveform whose pulse width depends on the data signal, for example an amplitude of an analog data signal. In particular, a current flow through the light-emitting semiconductor device can thus be set depending on the data signal, namely by the PWM voltage waveform.

In this context, the period duration of the ramp signal is selected to be many times smaller than a time interval between two successive "scan" voltage pulses, e.g. by a factor of 2-100, preferably by a factor of 50. Accordingly, the period duration is also selected to be a factor of at least 1 to many times smaller than the refresh rate of the display device.

Advantageously, the proposed picture element can generate an analog PWM signal at the pixel or sub-pixel level. For this purpose, only a small integration depth is required within a picture element, while a complex and precise circuit can be arranged outside the picture element, for example.

In one embodiment, the data signal comprises a predetermined number of digital data bits. The storage element has a plurality of data capacitors corresponding to the predetermined number of digital data bits. Corresponding to the predetermined number of digital data bits, the control switch has a plurality of control units which are each set up to feed one of the digital data bits, depending on the selection signal, to an adder connected upstream of the first input of the comparison unit and to hold it in one of the data capacitors in each case.

The digital data bits represent a predetermined range of values, such as [0;7] for 3 data bits, each representing a gradation of the brightness of the semiconductor device. The individual data bits are supplied to the picture element in an exemplary sequential manner, the selection signal comprising a number N of pulses corresponding to the predetermined number N of digital data bits. Alternatively, a delay element is connected upstream of each of the control units, which delays a single pulse of the selection signal between successive control units in each case in accordance with the time sequence of the data bits. In this context, the data capacitors can have different capacitances in order to be able to map a multiplier of the data bit significance. For 3 data bits, for example, the first data capacitor could have 4 times the capacitance of the third data capacitor and the second data capacitor could have 2 times the capacitance of the third data capacitor. In this context, the control of the semiconductor device can be designed in particular in such a way that the charge of the individual data capacitors remains constant. Alternatively, it is also conceivable to connect a corresponding multiplier upstream of the adder in each case.

Advantageously, digital data signals can be used to generate the analog PWM signal at pixel or sub-pixel level. In this context, the ramp signal is available in analog form.

In one embodiment, the semiconductor device is designed as an LED and has a first electrode and a second electrode. In particular, this can be a so-called μLED. In one embodiment, the comparison unit is designed as a comparator. In one embodiment, the supply switch is designed as a supply transistor. An example of this is a thin-film transistor. In one embodiment, the control switch comprises a control transistor. This is also a thin-film transistor by way of example. In one embodiment, both the supply transistor and the control transistor each have a control electrode, a drain electrode, and a source electrode. By a drain electrode is meant here and in the following the drain terminal of a transistor. Similarly, the source electrode refers to a source terminal and the control electrode refers to a gate terminal of the transistor. In one embodiment, the storage element comprises a data capacitor having a first electrode and a second electrode.

In one embodiment, the supply transistor is coupled to the first supply terminal via its source electrode. Furthermore, the supply transistor is coupled to the output of the comparator via its control electrode. Further, the supply transistor is coupled to the first electrode of the LED via its drain electrode. The LED is coupled to the second supply terminal via its second electrode. The control transistor is coupled to the data input via its source electrode. Furthermore, the control transistor is coupled to the selection input via its control electrode. Further, the control transistor is coupled via its drain electrode to the first input of the comparator as well as the first electrode of the data capacitor. The second electrode of the data capacitor is coupled to the second supply terminal.

The components of the picture element connected upstream of the LED of the picture element according to this embodiment are also referred to here and hereinafter collectively as the driver unit. In an advantageous manner, the aforementioned driver unit enables a (sub-)pixel-internal generation of a PWM signal for operating the LED. An expensive, complex or space-consuming microcontroller that could be used in this context is merely optional.

In one embodiment, the picture element has a ramp input which is provided for receiving a ramp signal generated externally with respect to the picture element and is coupled to the second input of the comparison unit. In an advantageous manner, the same ramp signal can thus be supplied to several picture elements of a display device, in particular to all picture elements of the display device, so that all picture elements are based on the same reference variable, a design space of the picture elements can be kept compact and components for generating the ramp signal can be saved.

In one embodiment, the picture element includes a reset input provided for receiving a predetermined reset signal. The picture element further comprises a ramp capacitor having first and second electrodes, the first electrode being coupled to the second input of the comparison unit and the second electrode being coupled to the second supply terminal. Further, the picture element comprises a ramp current source coupled to the first electrode of the ramp capacitor and adapted to charge the ramp capacitor. Furthermore, the picture element comprises a ramp transistor having a control electrode, a drain electrode and a source electrode. The ramp transistor is coupled to the second supply terminal via its drain electrode. Furthermore, the ramp transistor is coupled to the reset input via its control electrode. Furthermore, the ramp transistor is coupled to the first electrode of the ramp capacitor via its source electrode.

In particular, the ramp transistor is arranged to allow a current flow between the first electrode of the ramp capacitor and the second supply terminal when a predetermined threshold value of a voltage representing the predetermined reset signal is exceeded and to block it otherwise. If the ramp transistor allows current flow, the ramp capacitor can be discharged via the ramp transistor, otherwise the ramp capacitor can be charged by the ramp current source. Depending on the charge state of the ramp capacitor, this results in a voltage that can be controlled by the reset signal and is applied as a ramp signal to the second input of the comparison unit. In this context, the reset signal is selected in particular in such a way that a ramp-like progression of the voltage applied to the second input of the comparison unit results. In particular, the reset signal can be a pulse signal whose period duration corresponds to that of the ramp signal.

Advantageously, an analog ramp signal for generating the PWM signal at pixel or sub-pixel level can be generated in addition to the analog PWM signal.

In one embodiment, the picture element has a supply current source arranged between the first supply terminal and the supply switch and arranged to provide a current for operating the light-emitting semiconductor device. Exemplarily, this is a transistor connected to the first supply terminal via its source electrode and connected to the supply switch via its drain electrode, or connected to the second electrode of the light-emitting semiconductor device via its source electrode, which is connected to the first supply terminal via its first electrode, and connected to the supply switch via its drain electrode. A control electrode of this transistor may serve as a control input of the supply current source, by way of example.

In one embodiment, the picture element has a dimming input. The supply current source has a control input that is coupled to the dimming input. The supply current source is arranged to control an amplitude of the current flow between the first and second supply terminals via the light-emitting semiconductor device as a dimming signal depending on a voltage applied to the dimming input. In particular, the same dimming signal may be supplied to a plurality of picture elements, for example, picture elements each forming a sub-pixel of a pixel, in particular an RGB triplet, or all picture elements of a column or row of the display device, or all picture elements of the display device, to implement global dimming of a plurality of pixels of the display device. In an alternative embodiment, the supply current source may also be combined with the supply transistor, i.e., during the on-time the supply transistor regulates the current flow (e.g., in the saturation region), and during the off-time it is non-conducting. A high level at the output of the comparison unit then corresponds to a voltage which impresses a corresponding current into the LED via the supply transistor.

In one embodiment, the picture element has a dimming input and a further comparison unit having first and second inputs and an output. The first input of the further comparison unit is coupled to the dimming input. The output of the comparison unit is coupled to the second input of the further comparison unit. The further comparison unit is set up to adjust a voltage at the output as a function of a comparison of a voltage applied to the first input and a voltage applied to the second input so that an amplitude of the voltage applied to the output of the comparison unit can be adjusted as a function of a voltage applied to the dimming input as a dimming signal. In particular, the amplitude of the voltage at the output of the further comparison unit can thus be adjusted to an amplitude of the dimming signal, while at the same time the pulse width of the signal at the output of the comparison unit can be maintained as the pulse width of the signal at the output of the further comparison unit.

In one embodiment, the picture element includes a dimming capacitor having first and second electrodes. The first electrode of the dimming capacitor is coupled to the control input of the supply power source. The second electrode of the dimming capacitor is coupled to the second supply terminal. In addition, the picture element includes a dimming transistor having a control electrode, a drain electrode, and a source electrode coupled to the dimming input via its source electrode. The dimming transistor is further coupled to the selection input via its control electrode and coupled to the first electrode of the dimming capacitor via its drain electrode. The dimming signal or a voltage representing the dimming signal can thus be supplied to the control input of the supply current source as a function of the selection signal or the voltage representing the selection signal and applied to the selection input, and can be held in the dimming capacitor. In other words, the dimming capacitor and the dimming transistor form a so-called "sample-and-hold" unit. In this way, individual dimming ("local dimming") of individual picture elements can be implemented in an advantageous manner.

In further embodiments, if the same dimming signal is to be supplied to multiple picture elements to enable global dimming of multiple picture elements of a display device, a single sample-and-hold unit may be associated with those multiple picture elements and coupled to the respective supply power source.

In one embodiment, the picture element has a set input for receiving a reference voltage. The supply current source is designed as a first compensation transistor. The ramp current source is designed as a second compensation transistor. The first and second compensation transistors each have a control electrode, a drain electrode, and a source electrode. The first compensation transistor is coupled to the first supply terminal via its source electrode. Furthermore, the first compensation transistor is coupled to the set input via its control electrode. Further, the first compensation transistor is coupled to the source electrode of the supply transistor via its drain electrode. The second compensation transistor is coupled to the first supply terminal via its source electrode. Furthermore, the second compensation transistor is coupled to the set input via its control electrode. Further, the second compensation transistor is coupled to the source electrode of the ramp transistor via its drain electrode.

In particular, the first compensation transistor and the second compensation transistor are arranged locally close to each other in such a way that a mismatch error is kept low. Preferably, the two compensation transistors are designed according to the common-centroid layout, for example to compensate for a gradient in the gate oxide. In this regard, reference is made to the statements of Daniel Payne in "A Review of an Analog Layout Tool called HiPer DevGen" and Nurahmad Omar in "Automated Layout Synthesis Tool for Op-Amp", the disclosure content of which is hereby incorporated by reference in its entirety.

In particular, the two compensation transistors are manufactured in the same manufacturing process, for example on the same wafer, and thus have the same properties due to the manufacturing process and the same environmental influences due to the arrangement so that in an advantageous manner with this connection a deviation in the first compensation transistor, for example in the current flow for operating the corresponding LED compared to other picture elements of the display device, for example due to layer thickness inaccuracies, also leads to a corresponding deviation in the second compensation transistor. By the circuitry, such a deviation can be fed back analogously, i.e. not discretized, to the ramp capacitor so that in case of an increased charging current a steeper charging curve results, thus a lower duty cycle of the PWM signal and consequently a reduced brightness of the LED, and thus mismatch errors between individual picture elements can be compensated without additional calibration.

In one embodiment, the picture element has a dimming terminal. The ramp current source is formed as a dimming transistor with a control electrode, a drain electrode and a source electrode. The dimming transistor is coupled to the first supply terminal via its source electrode. Furthermore, the dimming transistor is coupled to the dimming terminal via its control electrode. Furthermore, the dimming transistor is coupled to the source electrode of the ramp transistor via its drain electrode.

Due to the circuit according to this embodiment, a voltage applied to the ramp capacitor for charging the ramp capacitor can be controlled depending on a voltage applied to the dimming terminal. The voltage applied to the dimming terminal can be supplied to the picture element, for example, by a dimming signal that differs from the aforementioned dimming signal. Depending on this dimming signal, it is possible in particular to control the duty cycle of the PWM signal. Analogously to the previous embodiments, the same dimming signal of this type can be supplied to several picture elements in order to implement global dimming of several picture elements of the display device.

In one embodiment, the picture element has a calibration input. Furthermore, the picture element has a calibration transistor with a control electrode, a drain electrode and a source electrode. The calibration transistor is coupled to the calibration input via its source electrode. Furthermore, the calibration transistor is coupled to the selection input via its control electrode. Further, the calibration transistor is coupled to the dimming terminal via its drain electrode. Further, the picture element includes a calibration capacitor having a first electrode and a second electrode. The calibration capacitor is coupled to the dimming terminal via its first electrode. Further, the calibration capacitor is coupled to the second supply terminal via its second electrode. Due to the interconnection according to this embodiment, a calibration signal applied to the calibration input can be supplied to the dimming terminal depending on the selection signal applied to the selection input, which calibration signal can be held in the calibration capacitor. In particular, the calibration transistor is set up to allow the voltage representing the calibration signal to be fed to the dimming connection and the calibration capacitor when a predetermined threshold value of the voltage representing the selection signal applied to the selection input is exceeded, and to block it otherwise. In other words, the calibration capacitor and the calibration transistor form a so-called “sample-and-hold” unit.

According to a second aspect, the invention relates to a display device. The display device is in particular a microLED display or another display based on active matrix technology.

In one embodiment, the display device comprises a plurality of picture elements according to the first aspect. In particular, the picture elements are arranged in rows and columns in a matrix-like manner.

The display device further comprises a plurality of column lines each connected to the respective selection input of the picture elements of one of the columns. Further, the display device has a plurality of row lines each connected to the respective data input of the picture elements of one of the rows.

Further, the display device comprises a control device connected to the plurality of column lines and adapted to generate a pulse as a selection signal for a selected column line from the plurality of column lines. The control device is further connected to the plurality of row lines and adapted to generate a data signal for a selected row line from the plurality of row lines.

In one embodiment, the display device includes a plurality of ramp lines each connected to the ramp input of one of the picture elements. The control device is connected to the plurality of ramp lines and is adapted to generate a ramp signal externally with respect to the picture elements for the plurality of ramp lines. In particular, the same ramp signal may be applied to a plurality of picture elements, such as all picture elements of a column or row of the display device, all picture elements of a portion such as a quadrant of the display device, or all picture elements of the display device.

In an alternative embodiment, the display device includes a plurality of reset lines each connected to the reset input of one of the picture elements. The control device is connected to the plurality of reset lines and adapted to generate a pulse as a predetermined reset signal for a selected one of the plurality of reset lines. In particular, the same reset signal may be supplied to a plurality of picture elements, such as all picture elements of a column or row of the display device, all picture elements of a portion such as a quadrant of the display device, or all picture elements of the display device.

In one embodiment, the display device has a plurality of first dimming lines each connected to the dimming input of one of the picture elements. Alternatively, the first dimming lines are each connected to the dimming input of one of the picture elements of a portion such as a quadrant of the display device or one of the picture elements of a row or column of the display device. Alternatively, the first dimming lines are connected to the dimming input of one of the picture elements of an RGB triplet of the display device. The control device is connected to the plurality of first dimming lines and adapted to generate a first dimming signal for a selected one of the plurality of first dimming lines.

Alternatively or additionally, in one embodiment, the display device includes a plurality of second dimming lines each connected to the dimming terminal of one of the picture elements. The control device is connected to the plurality of second dimming lines and is adapted to generate a second dimming signal for a selected second dimming line from the plurality of second dimming lines.

Alternatively or additionally, in one embodiment, the display device comprises a plurality of set lines each connected to the set input of one of the picture elements. Furthermore, the display device comprises a reference voltage source connected to the plurality of set lines and adapted to provide a reference voltage for the plurality of set lines.

Alternatively or additionally, in one embodiment, the display device has a plurality of calibration lines each connected to the calibration input of one of the picture elements. The control device is connected to the plurality of calibration lines and is adapted to generate a calibration signal for a selected calibration line from the plurality of calibration lines.

In one embodiment, the display device comprises a plurality of first delay elements each coupled to the column lines of two successive columns and arranged to provide the selection signal respectively delayed by a predetermined first time duration $\tau 1$ at the respective second column line compared to the respective first column line. Furthermore, the display device comprises a plurality of second delay elements each coupled to the ramp lines of two successive columns and arranged to provide the ramp signal respectively delayed by a predetermined second time duration $\tau 2$ at the respective second ramp line compared to the respective first ramp line. The predetermined first time duration $\tau 1$ is in a predetermined relationship to the predetermined second time duration $\tau 2$.

In one embodiment, the predetermined ratio is $\tau 1/\tau 2=1$. In other words, the ramp signal and the selection signal are synchronous with each other.

Further advantageous embodiments and further embodiments of the picture element and the display device result from the embodiment examples described below in connection with the figures.

Figure 2:
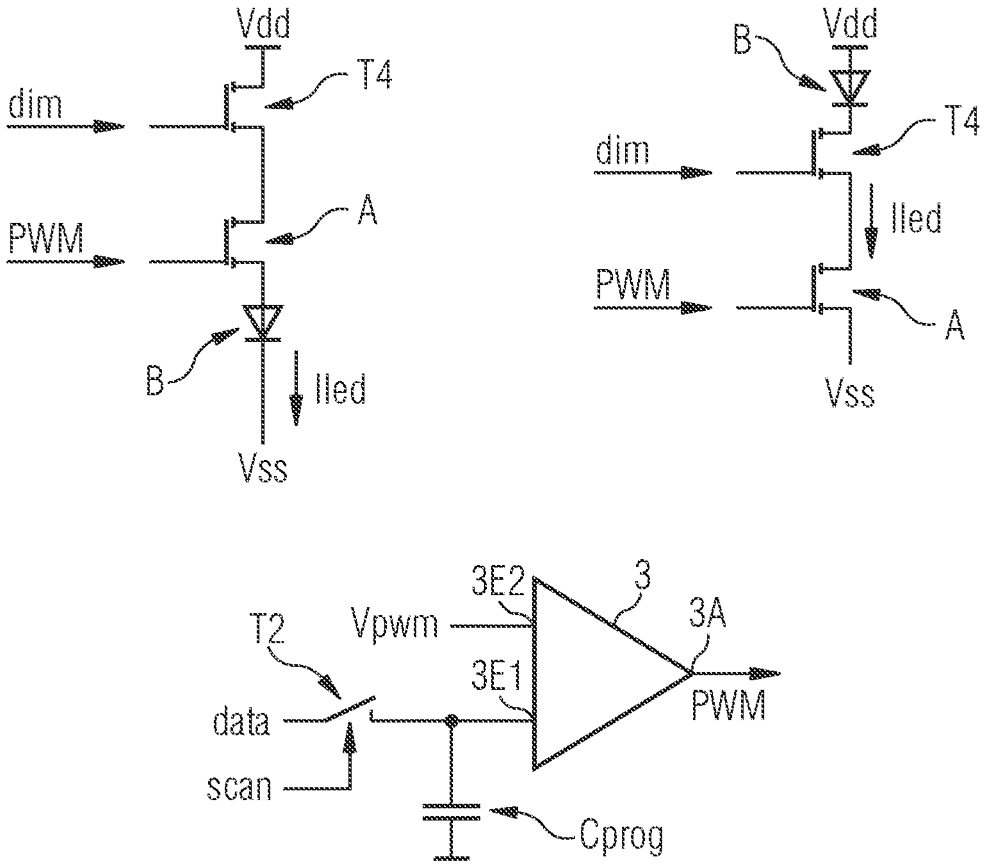
Figure 3:
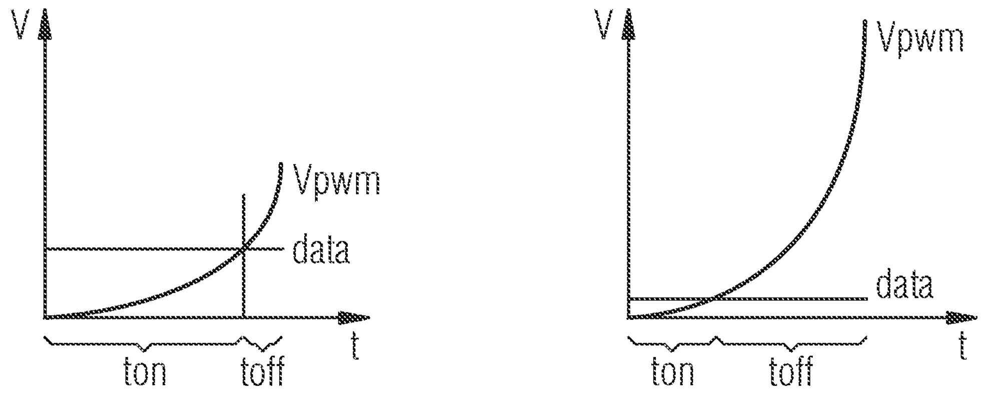
Figure 4:
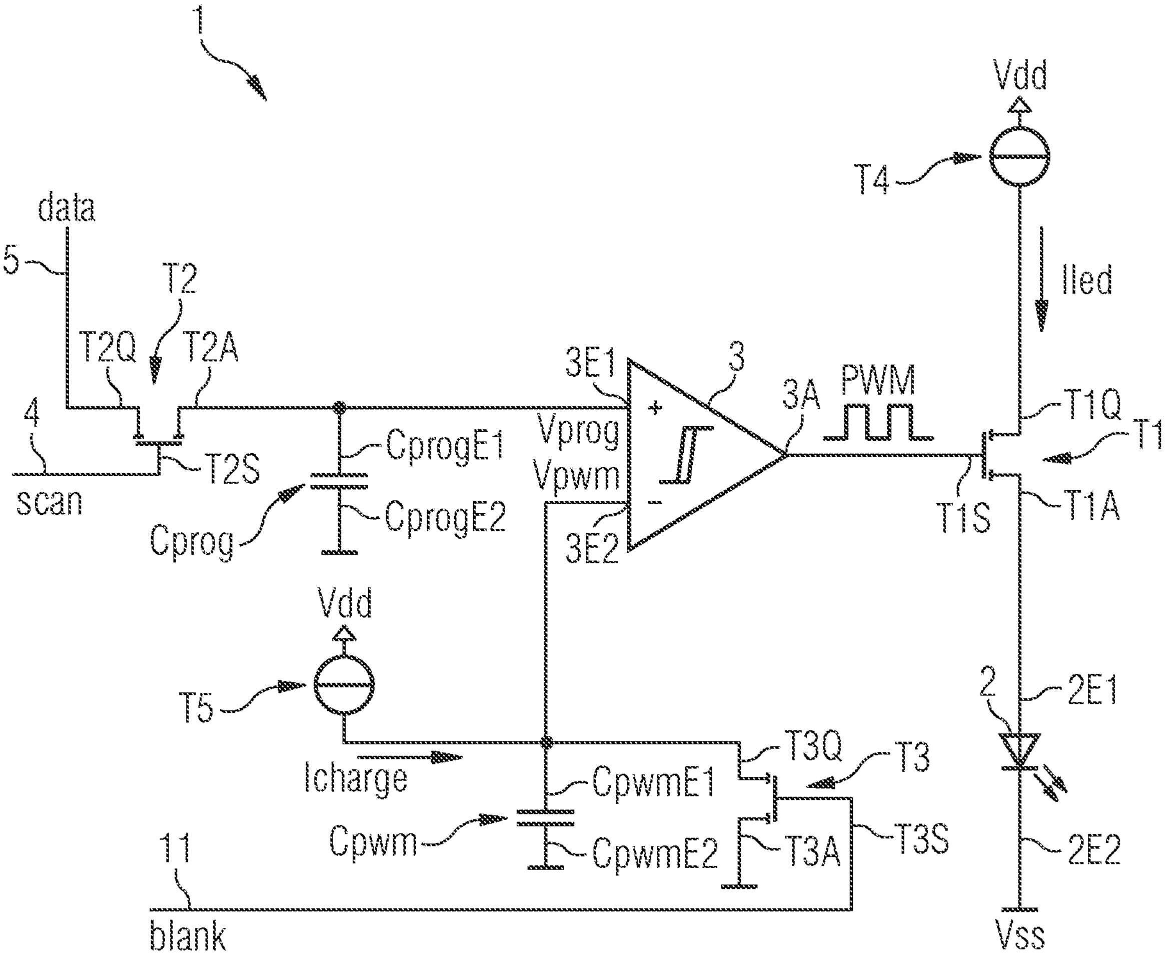
Figure 5:
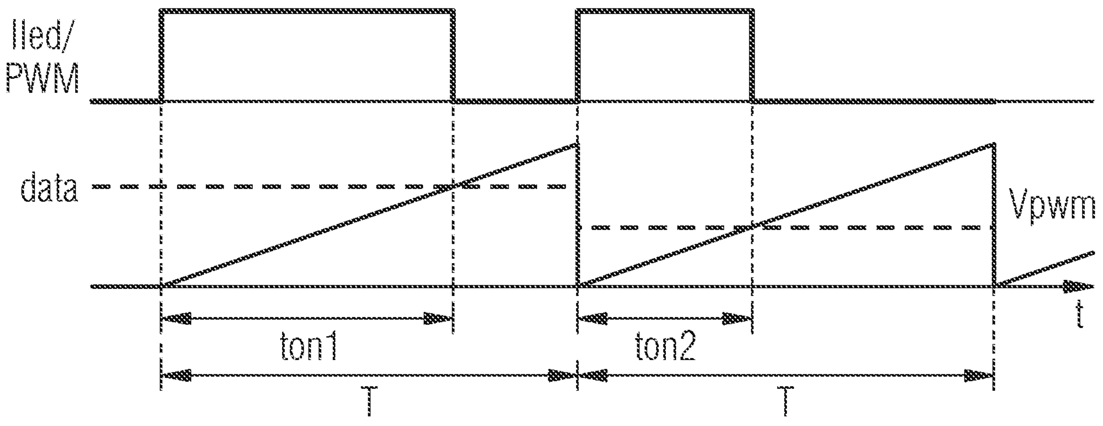
Figure 6:
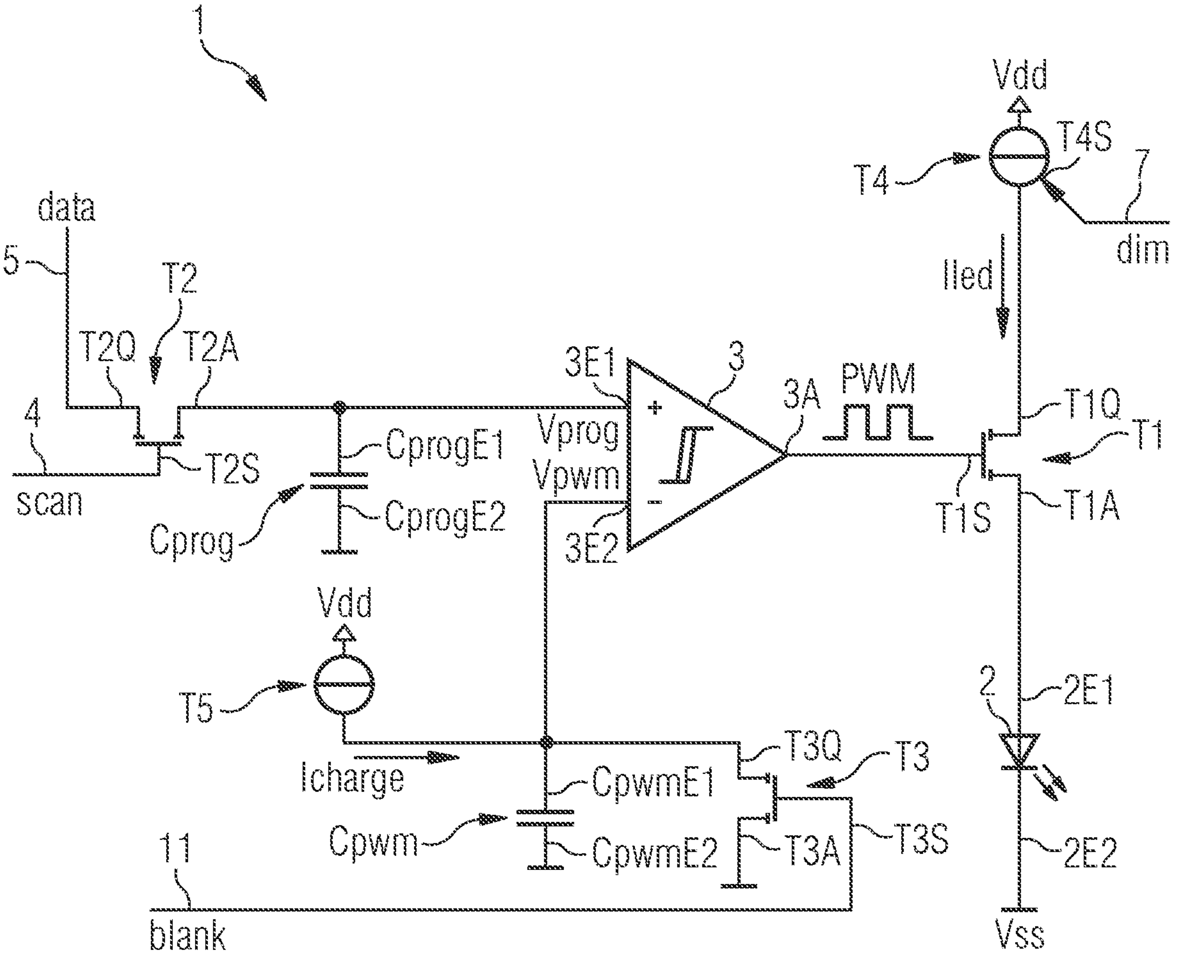
Figure 7:
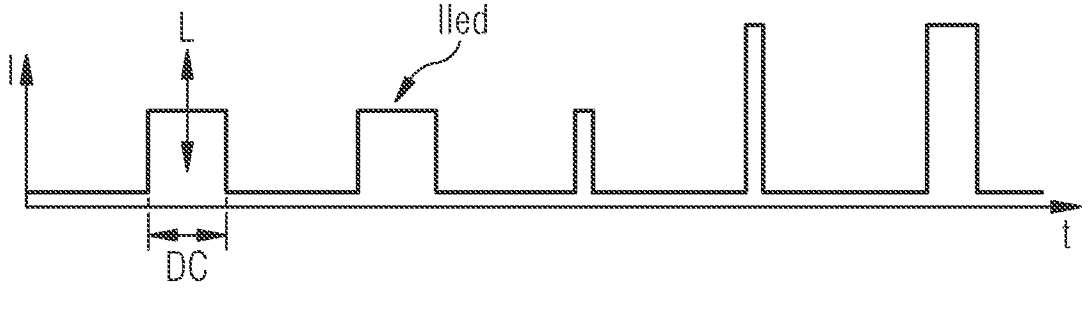
Figure 8:
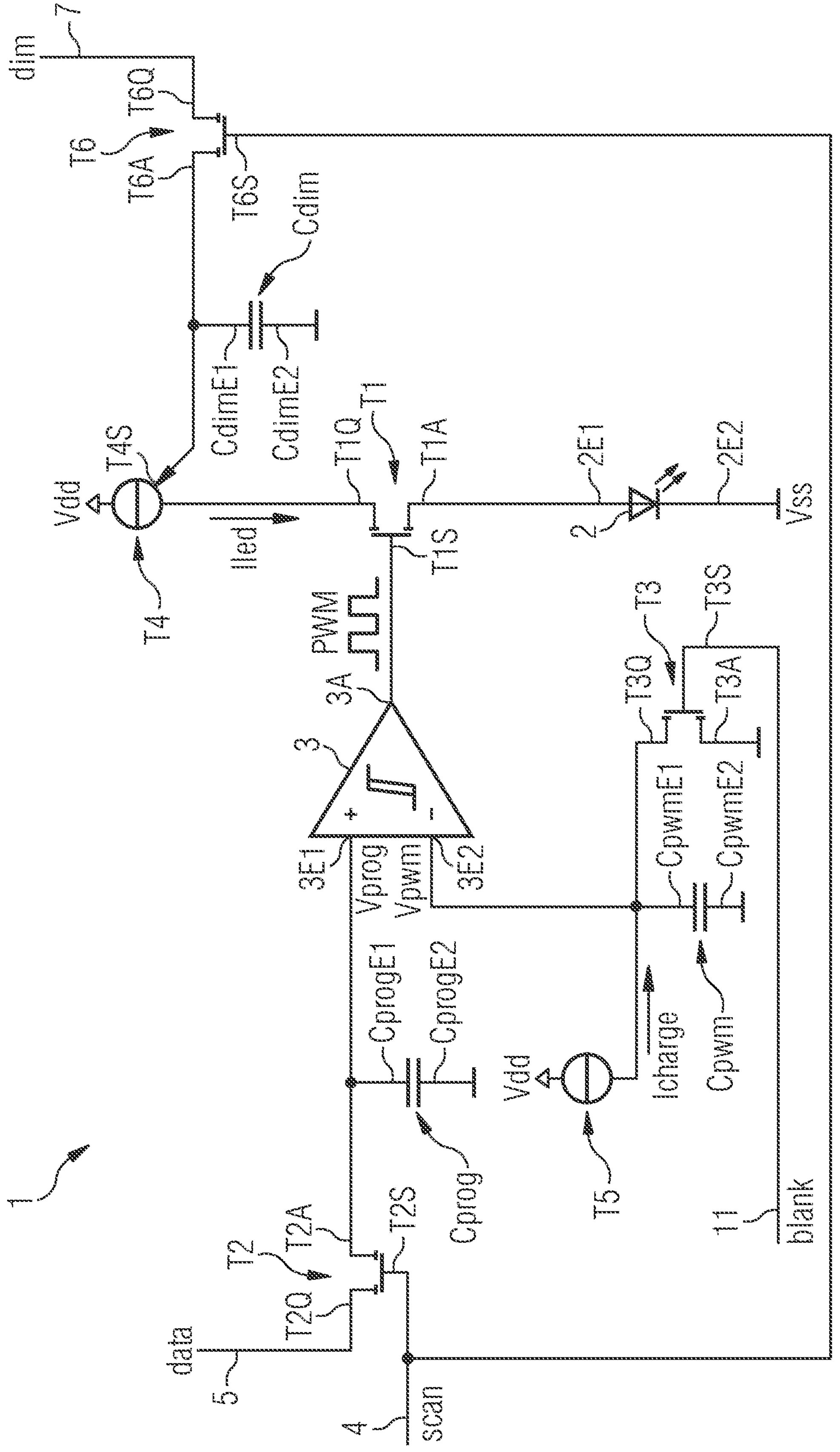
Figure 9:
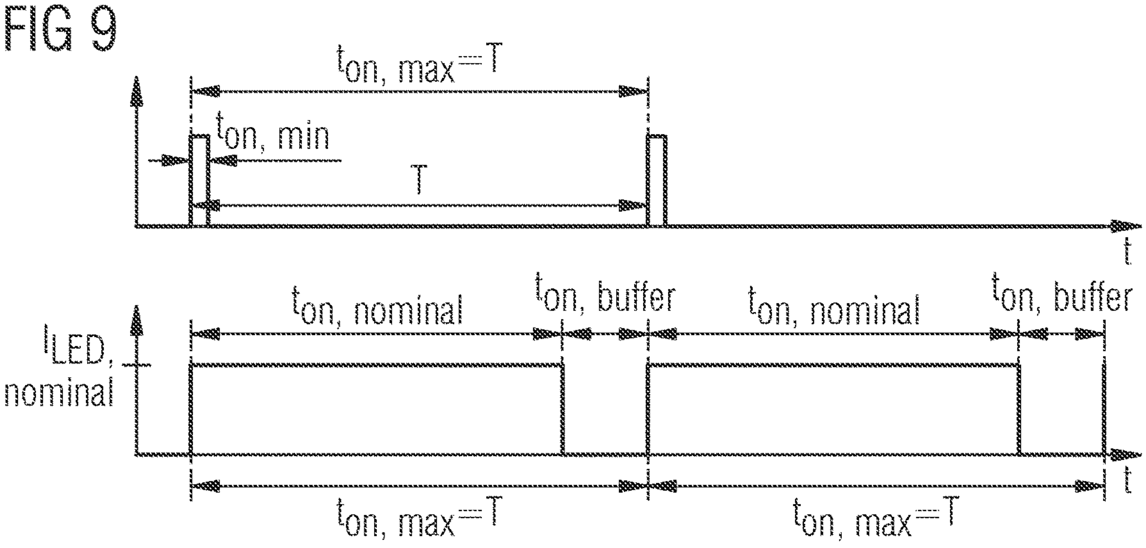
Figure 10:
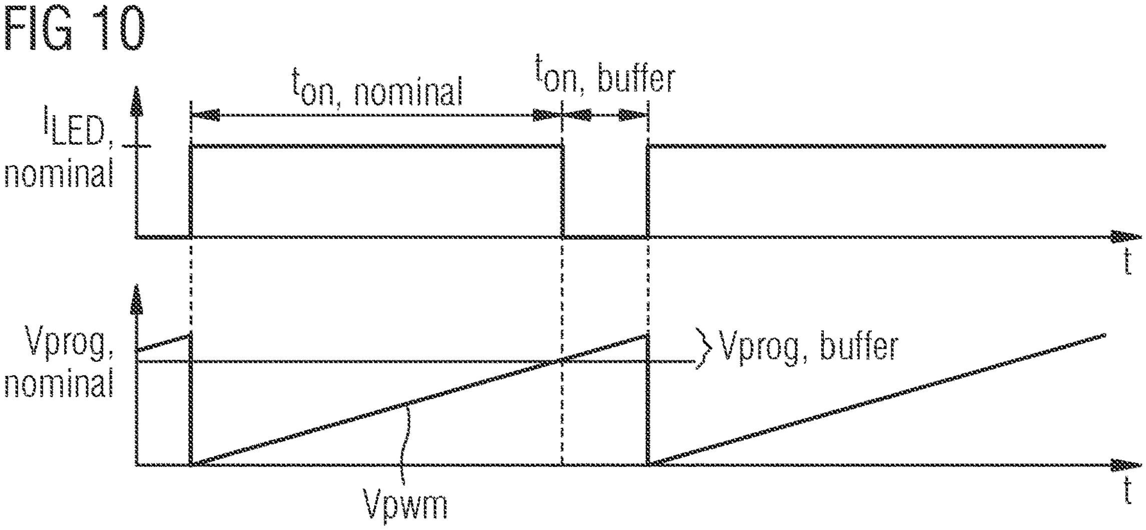
Figure 11:
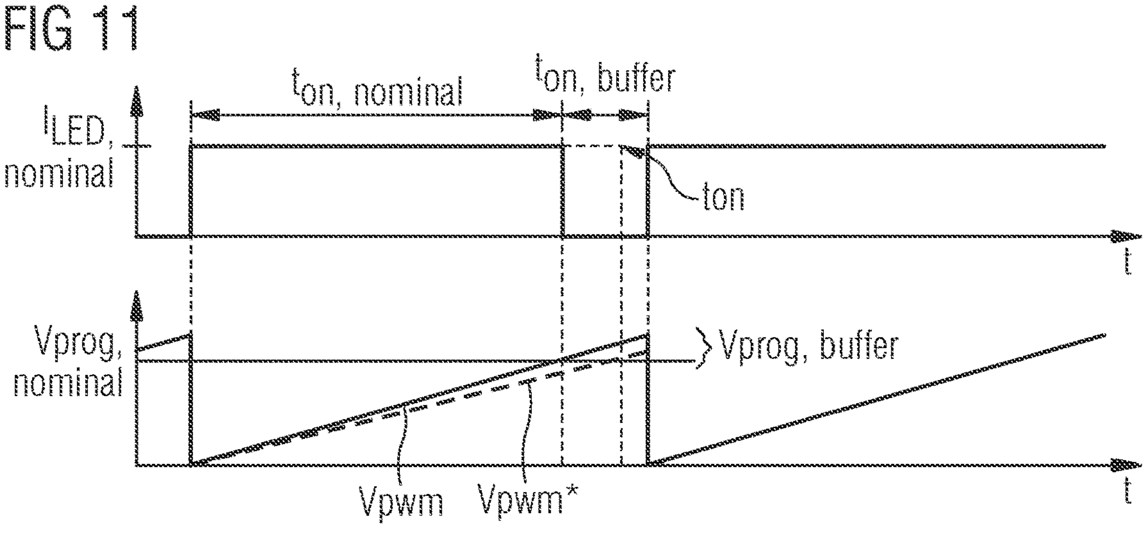
Figure 12:
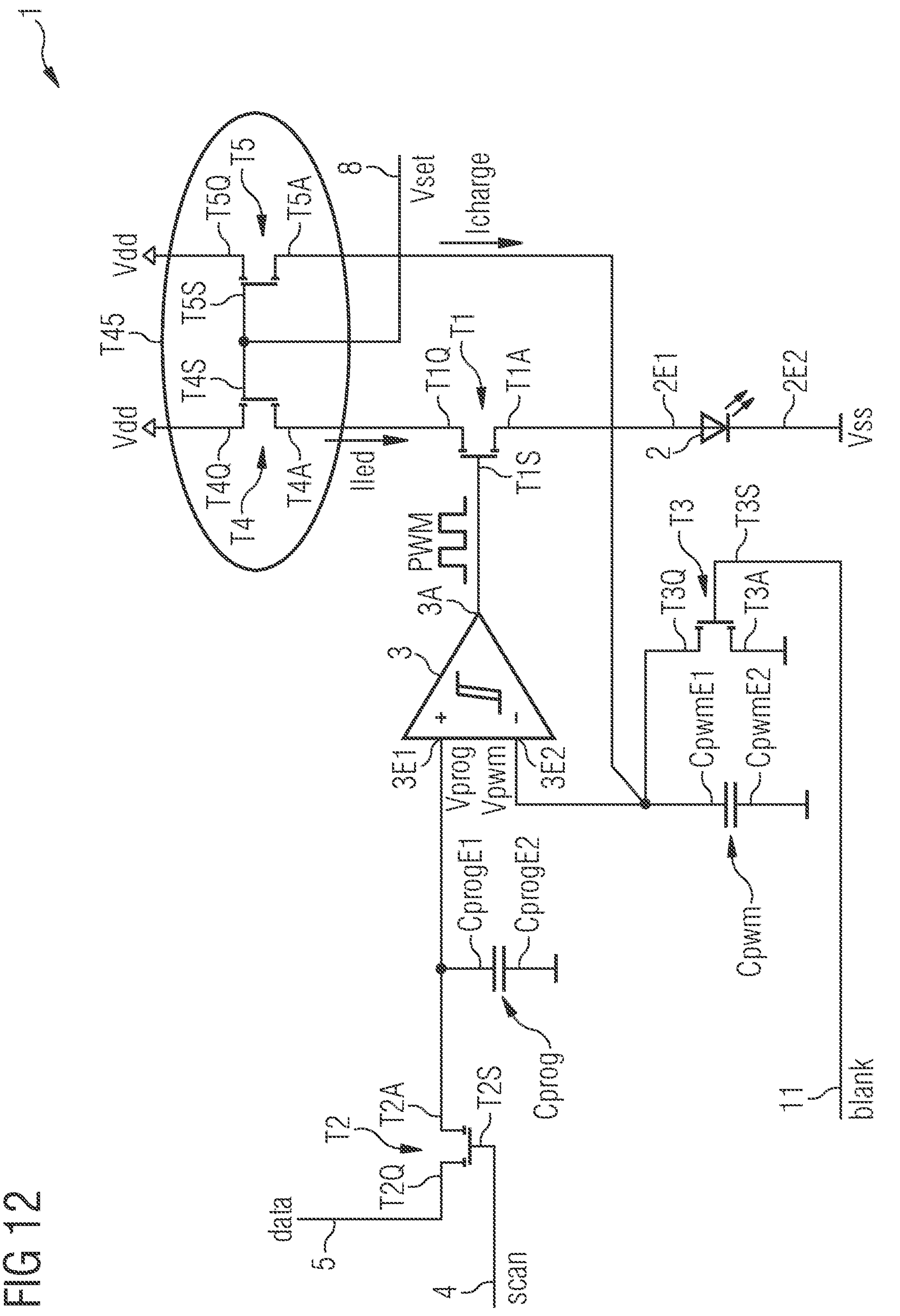
Figure 13:
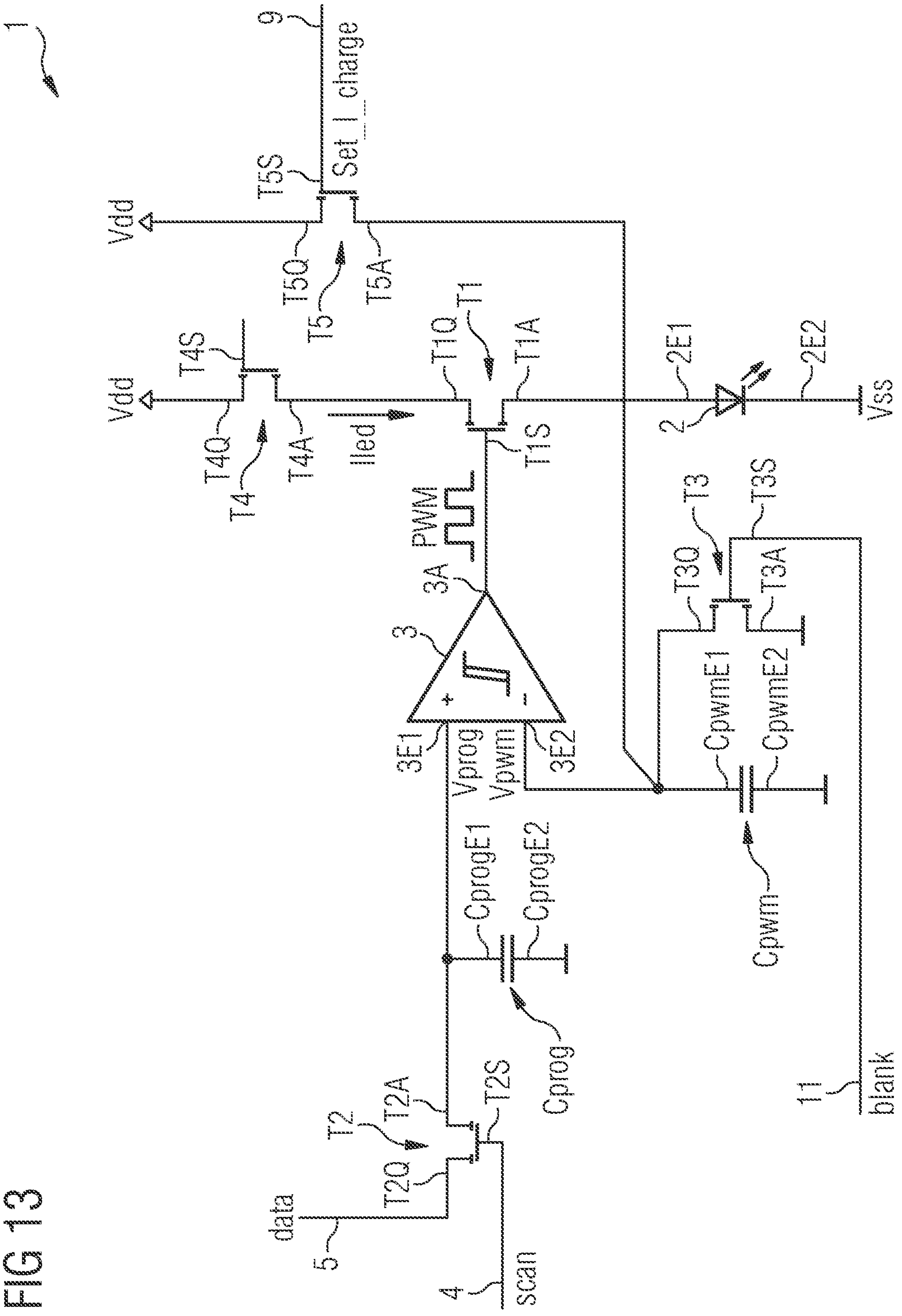
Figure 14:
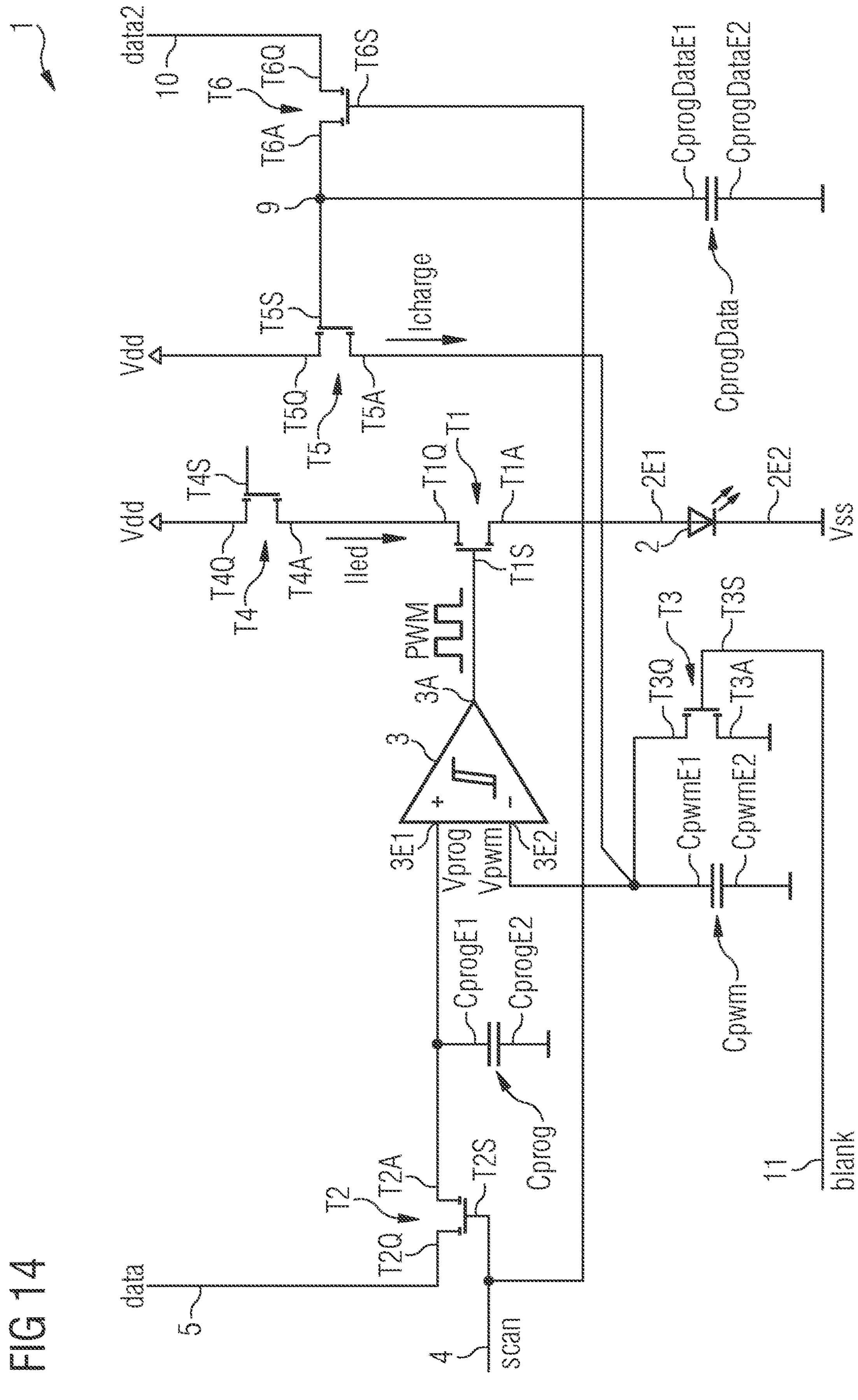
Figure 15:
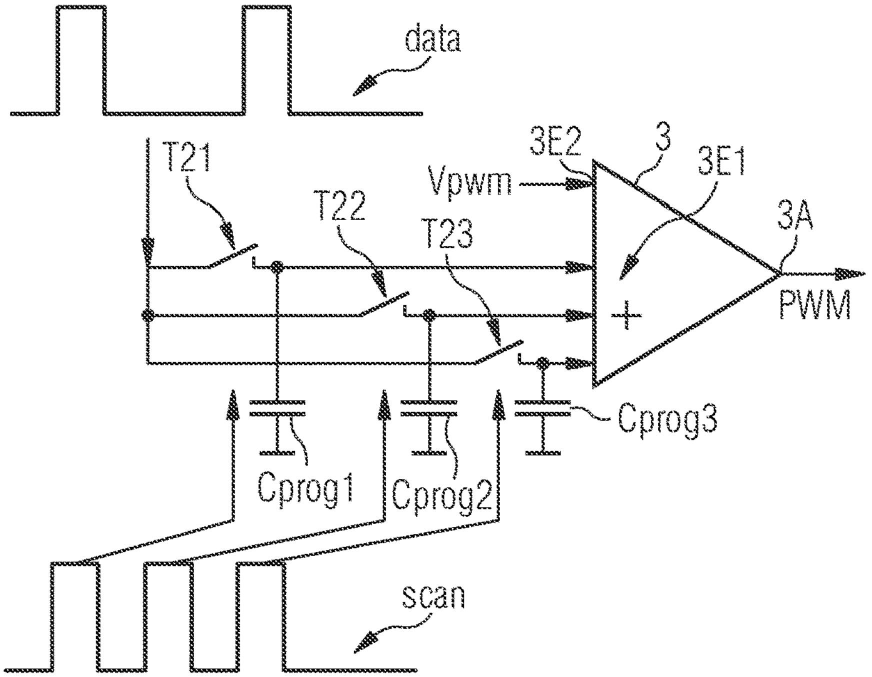
Figure 16:
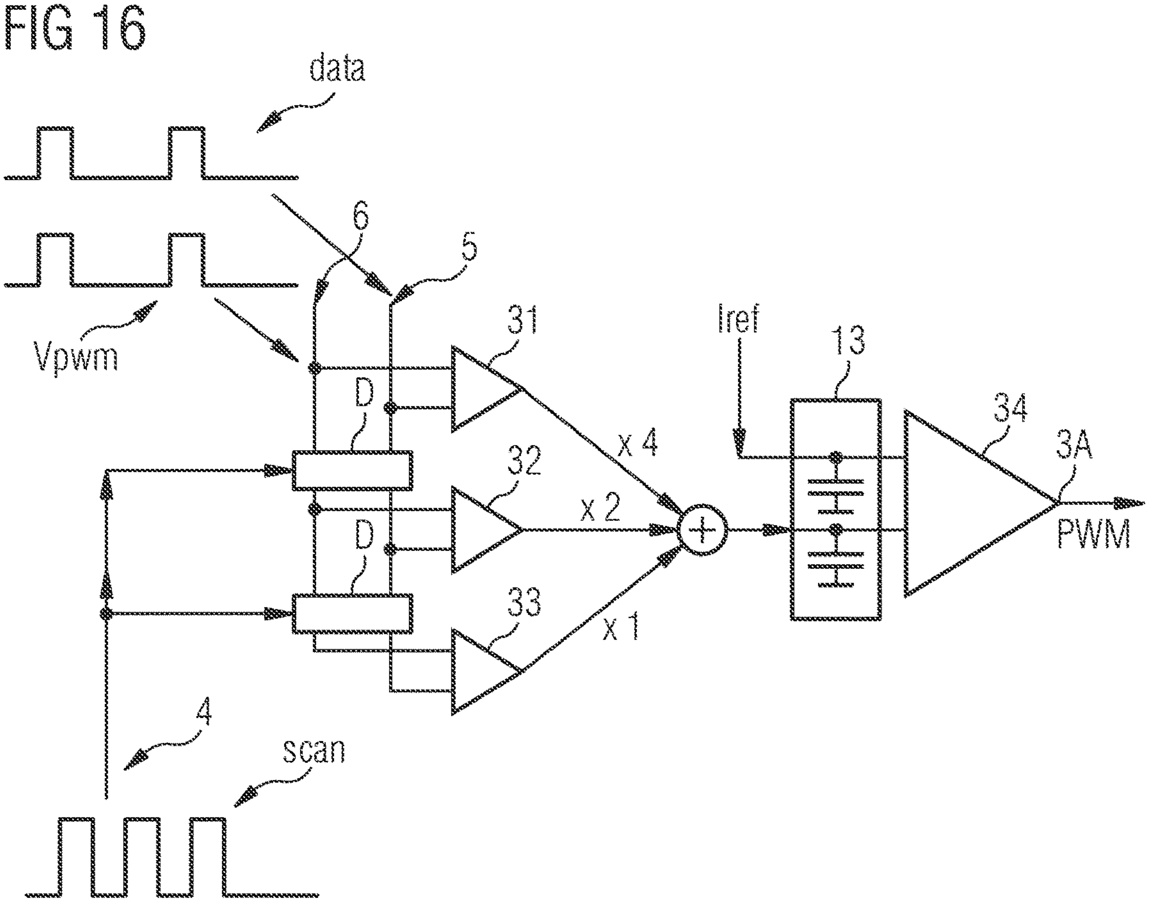
Figure 17:
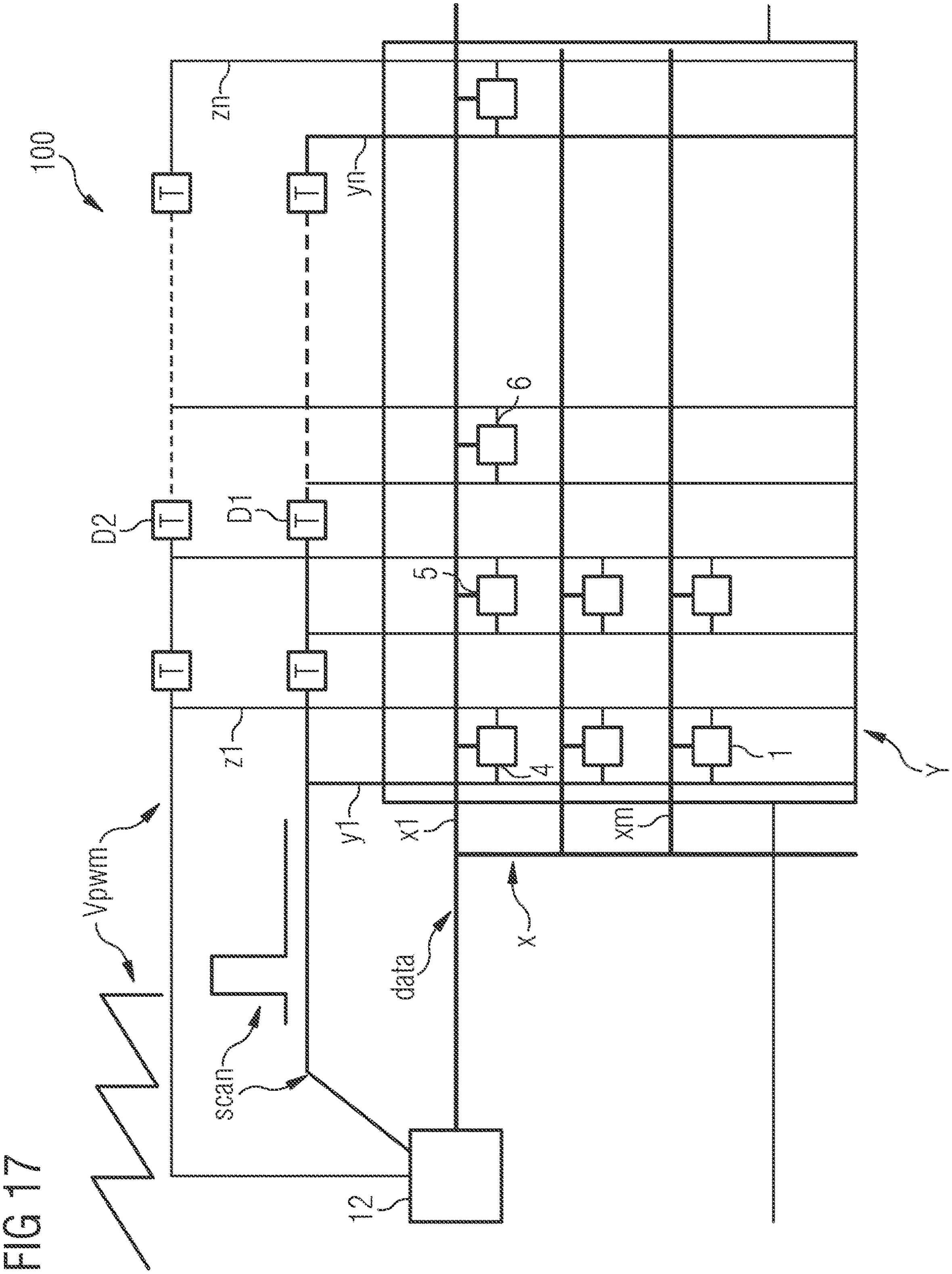

FIG. 1 shows a first embodiment of a picture element for a display device,

FIG. 2 shows an example of a detailed view of the picture element according to FIG. 1, FIG. 3 shows an example of a signal characteristics in the intended operation of the picture element according to FIG. 1, FIG. 4 shows a second embodiment of a picture element for a display device, FIG. 5 shows a signal waveform in the intended operation of the picture element 1 according to FIG. 4, FIG. 6 shows a third embodiment of a picture element for a display device, FIG. 7 shows a signal curve when operating an LED of the picture element according to FIG. 6, FIG. 8 shows a fourth embodiment of a picture element for a display device, FIGS. 9-11 show a signal overview in intended operation of a picture element for a display device according to a fifth and sixth embodiment, FIG. 12 shows a seventh embodiment of a picture element for a display device, FIG. 13 shows an eighth embodiment of a picture element for a display device, FIG. 14 shows a ninth embodiment of a picture element for a display device, FIG. 15 shows an eleventh embodiment of a picture element for a display device, FIG. 16 shows a twelfth embodiment of a picture element for a display device, FIG. 17 shows an exemplary display device.

Elements that are identical, similar or have the same effect are given the same reference signs in the figures. The figures and the proportions of the elements shown in the figures are not to be regarded as true to scale. Rather, individual elements, in particular layer thicknesses, may be shown exaggeratedly large for better representability and/or understanding.

For example, an active-matrix-driven display device can be based on μLEDs, where each pixel of the display device corresponds to a cell with three μLEDs (sub-pixels). Each of the μLEDs is a red chip, a green chip and a blue chip. Each of these sub-pixels is associated with a circuit with active components in the form of thin-film transistors (TFTs) for regulating the current across the respective μLED. Such a unit is referred to here and in the following as a picture element of the display device. To adjust the brightness of individual sub-pixels ("dimming"), the current can be controlled analogously via a programming voltage. As there is a dependency between color location and current in LEDs, such a pure analog operation may result in changes of the white point (color location/color gamut). To circumvent this problem, the brightness of the sub-pixels can be adjusted using pulse width modulation (PWM). This is called digital operation. This pulse width modulation can be generated by repeated programming of the pixel cells. A sub-pixel is then only operated for a certain time with the nominal current and remains off the rest of the time. The viewer perceives the average brightness over time as the static brightness of the sub-pixel.

Here, the pulse width modulation is generated outside the display device by a repetitive programming sequence. However, to achieve a color depth of 8 bits per color (24 bits in total, standard) with digital operation, switching times are necessary in the case of high-resolution displays with at least 60 Hz repetition frequency, which cannot be achieved with today's TFT technology.

As an alternative to generating the pulse width modulation via the external programming voltage, a microcontroller within a pixel can be connected to one or more LEDs and control their operation. However, this is associated with high costs and enormous space requirements, especially if such a microcontroller is assigned to each sub-pixel of the display device.

In the following, a picture element and a display device are disclosed which allow to generate a pulse width modulation for (sub-)pixels of an active matrix display device in a pixel fine manner. In particular, it is proposed to generate an analog PWM signal within a picture element in order to efficiently achieve high dynamic range in terms of bit depths, gray levels, and dimming while maintaining low integration depth within a picture element. A complex or precise circuit for controlling the individual picture elements can be provided outside the picture elements.

FIG. 1 shows a first embodiment of a picture element 1 for a display device 100.

A picture element 1 having a light-emitting semiconductor device B in a matrix arrangement of a display device 100 (cf. FIG. 17) is driven by a combination of a selection signal scan and data signal data. The selection signal scan is, for example, a pulse with a pulse width of 10 ns, which is generated for each of the picture elements 1 of a display device 100 and is repeated after 16 ms (this corresponds to the frame rate of the display device 100). The data signal is, for example, an analog grayscale value provided by a digital-to-analog converter.

The display device 100 has a plurality of picture elements 1 arranged in rows x and columns y, respectively (FIG. 17). By a control device 12 arranged externally with respect to the individual picture elements 1, the selection signal scan is provided to the picture elements 1 via a plurality of column lines y1 to yn each connected to a corresponding selection input 4, and the data signal data is provided to the picture elements 1 via a plurality of row lines x1 to xm each connected to a corresponding data input 5 (supply connections are not shown in more detail).

The picture element 1 is assigned a memory for an analog voltage signal, the data signal data. Instead of converting this analog voltage signal into an analog current value, the picture element 1 generates a pulse-width modulated current flow Iled as a function of the analog voltage signal, the amplitude of which can additionally (during the on time) be analog current controlled.

For this purpose, a unit 1S is associated with the picture element 1 (FIG. 2), which comprises a circuit with active components, for example in the form of thin-film transistors (TFTs). In particular, this may be a μIC or a TFT circuit of the active matrix backplane of the display device 100. The picture element 1 has a first supply terminal Vdd and a second supply terminal Vss, via each of which a supply voltage or a supply current for operating the semiconductor device B can be provided. A supply switch A may be connected upstream of the semiconductor device B and control the current flow Iled depending on a PWM signal PWM generated by the unit 1S. On the basis of FIG. 2, two exemplary detailed views of the picture element 1 according to FIG. 1 are shown.

As shown on the left, the supply switch A is designed as a PMOS transistor as an example and is connected upstream of the semiconductor device B. A first supply voltage is provided via the first supply terminal Vdd, and ground or a negative operating voltage of the semiconductor device B is applied to the second supply terminal Vss, as an example. The first supply terminal Vdd is connected to the supply switch A via a supply current source T4. The supply current source T4 is exemplarily controllable, for example designed as a PMOS transistor and set up to provide a current at the input of the supply switch A depending on a dimming signal dim. Depending on the PWM signal PWM, the current flow Iled is pulse width modulated so that a brightness of the semiconductor device B can be adjusted. This setup can also be referred to as a "common cathode".

In the illustration on the right, ground is present at the second supply terminal. The first supply terminal Vdd provides, for example, the first supply voltage or a positive operating voltage of the semiconductor device B. The first supply terminal Vdd is connected via the semiconductor device B to the supply current source T4, which is connected downstream of the supply switch A. The supply current source T4 and the supply switch A are exemplarily designed here as NMOS transistors. This design can also be referred to as a "common anode".

In the center, FIG. 2 shows a possible implementation of unit 1S. A selection input 4 (cf. FIG. 1) of the unit 1S provides the selection signal scan, a data input 5 provides the data signal data and a ramp input 6 provides a ramp signal Vpwm, which has a saw-tooth like voltage characteristic. The data signal data is applied to a switch T2, which is controlled depending on the selection signal scan to store the data signal data in a data capacitor Cprog (sample-and-hold) and to supply it to a first input 3E1 of a comparison unit. The comparison unit is exemplarily designed as a comparator 3, flip-flop or the like. The ramp signal Vpwm is applied to a second input 3E2 of the comparison unit. Depending on an amplitude of the data signal data and a slope and pulse width of the ramp signal Vpwm, a pulse width of the PWM signal PWM results at the output 3A of the comparison unit.

The ramp signal Vpwm is exemplarily a voltage output from a digital-to-analog converter, which periodically has a logarithmic, exponential or linear slope. A maximum and minimum voltage of the ramp signal Vpwm exemplarily define a dimming range of the semiconductor device B, that is, a minimum and maximum pulse width of the PWM signal PWM. Exemplarily, the ramp signal Vpwm has an integer multiple of saw teeth per frame of the display device 100, and the reciprocal of the frame rate of the display device 100 corresponds, in other words, to N times the period of the ramp signal Vpwm. In particular, the ramp signal Vpwm has exactly one saw-tooth for each (sub)pixel of the display device 100 per frame. On the basis of FIG. 3, in each case an exemplary saw-tooth of a signal curve of the ramp signal Vpwm as well as an analog gray scale value of the data signal data in the intended operation of the picture element 1 according to FIG. 1 over the time t are shown. The ramp signal Vpwm is here synchronous with the data signal data, i.e., a ramp start always occurs, for example, after the pulse of the selection signal scan has ended and the analog grayscale value of the data signal data has been loaded into the data capacitor Cprog accordingly.

The ramp signal Vpwm here exemplarily has a non-linear slope. Depending on the embodiment, the semiconductor device B is in an on state (time duration ton) as long as a voltage V represented by the data signal data is greater than a voltage V represented by the ramp signal Vpwm and otherwise in an off state (time duration toff), or vice versa.

As shown on the left in FIG. 3, the ramp signal Vpwm and the data signal data can cover the same voltage range or cover different voltage ranges to improve resolution, for example in the low nanosecond range (shown on the right in FIG. 3). Various combinations of ramp signal Vpwm and data signal data are conceivable in this context: A linear ramp signal Vpwm can be combined with a linear data signal data, a nonlinear ramp signal Vpwm with a linear data signal data or a linear ramp signal Vpwm with a nonlinear data signal data.

In the picture element 1 according to the first embodiment example, it is in particular intended to provide the ramp signal Vpwm to a plurality of picture elements 1 of a display device 100, in particular to all picture elements 1 of a quadrant of the display device 100 or entirely to all picture elements 1 of the display device 100. Such an approach is also referred to herein and hereinafter as "global". As shown with reference to FIG. 17, in this context the control device 12 may be connected to a corresponding ramp input 6 of the picture elements 1 by a plurality of feed lines z1 to zn to provide the same ramp signal Vpwm. The individual feed lines z1-zn are coupled approximately via delay elements D2, which enable a delay of approximately exactly one period duration. Synchronously to this, the column lines y1-yn are coupled via delay elements D1, which enable the same delay. Furthermore, the delay elements D1, D2 can serve as amplifiers to maintain an integrity of the individual signals. Advantageously, a global ramp signal Vpwm enables dynamic adjustment of the brightness of the display device 100 over the pulse width of the respective PWM signal PWM for the display device 100 as a whole or for quadrants.

With reference to FIG. 4, a second embodiment example of a picture element 1 for a display device 100 is shown. In contrast to the first embodiment example, here instead of a global ramp signal Vpwm the ramp signal Vpwm is generated by a picture element internal circuit. In this context, instead of the ramp input 6 (FIG. 1), the picture element 1 according to FIG. 1 is assigned, for example, a reset input 11 (FIG. 4) via which a reset signal blank is provided.

The data signal data is stored in the data capacitor Cprog. The switch T2 is formed here as a control transistor T2, which is connected with its source electrode T2Q to the data input 5, with its control electrode T2S to the selection input 4, and with its drain electrode to a first electrode CprogE1 of the data capacitor Cprog, which is coupled with its second electrode CprogE2 to the second supply terminal Vss. The first electrode CprogE1 is further coupled to the first input 3E1 of a comparator 3, at the output 3A of which the PWM signal PWM is output. The PWM signal PWM is supplied to a control electrode T1S of a supply transistor T1, which is connected by its source electrode T1Q to the first supply terminal Vdd via a supply current source T4 and is connected via its drain electrode T1A to a first electrode 2E1 of an LED 2, which is connected via its second electrode 2E2 to the second supply terminal Vss.

A current source T5 connected to the first supply terminal Vdd is coupled to a first electrode CpwmE1 of a ramp capacitor Cpwm and charges it with a constant charging current Icharge. The ramp capacitor Cpwm is connected with its second electrode CpwmE2 to the second supply terminal Vss. The constant charging current Icharge produces a linear increase in the voltage Vpwm applied to the ramp capacitor Cpwm over time t. The comparator 3 is connected to the second supply terminal Vss via its second electrode CpwmE2. The comparator 3 is coupled via its second input 3E2 to the first electrode CpwmE1 of the ramp capacitor Cpwm, compares the voltage Vprog applied to the data capacitor Cprog with the voltage Vpwm applied to the ramp capacitor Cpwm, and switches its output 3A to "low" when the same voltage is applied to the ramp capacitor Cpwm as to the data capacitor Cprog. After a period T has elapsed, the ramp capacitor Cpwm is discharged via the reset signal blank and the process starts again. In this context, the reset input 11 is coupled to a control electrode T3S of a ramp transistor T3, which is coupled with its drain electrode T3A to the second supply terminal Vss and with its source electrode to the first electrode CpwmE1 of the ramp capacitor Cpwm.

FIG. 5 shows a signal curve in the intended operation of the picture element 1 according to FIG. 4. At the beginning, the ramp capacitor Cpwm. The voltage Vprog (=target gray value) represented by the data signal data is stored in the data capacitor Cprog and is greater than the voltage Vpwm (ramp signal) applied to the ramp capacitor Cpwm. The output 3A of the comparator 3 is thus at "high" level and the control transistor T1 (e.g. NMOS) switches through. Subsequently, the ramp capacitor Cpwm is charged. After time ton1, the ramp signal Vpwm exceeds the voltage Vprog represented by the data signal data and output 3A assumes a "low" level, causing control transistor T1 to block current flow Iled. After a period T has elapsed, a pulse is provided as a reset signal blank so that the ramp capacitor Cpwm discharges and the process can be restarted (with modified data signal data and correspondingly different ton2).

With reference to FIG. 6, a third embodiment example of a picture element 1 for a display device 100 is shown, which differs from the second embodiment example in that the supply current source T4 is designed to be controllable:

The amplitude of the current flow Iled across the LED 2 during on-time ton is externally specified by a global dimming signal dim via an adjustable current source T4. In this context, the picture element 1 has an additional dimming input 7. The dimming signal dim can, for example, adjust several picture elements 1 together, for example a pixel with 3 subpixels (RGB), for example several pixels at the same time, for example a whole row x, a whole column y or the whole display device 100. The current source T4 can also be combined with the control transistor T1, i.e. during the on-time ton the control transistor T1 regulates the current (e.g. in the saturation range), during the off-time toff it is non-conducting.

FIG. 7 shows an example of the current flow Iled across the LED 2 in the third embodiment. An amplitude L of the current flow Iled is specified globally by the dimming signal dim. A duty cycle of the PWM signal PWM or a pulse width DC of the current flow Iled is defined pixel by pixel by the PWM signal PWM or ramp signal Cpwm and data signal data.

FIG. 8 shows a fourth embodiment of a picture element 1 for a display device 100, which differs from the third embodiment in that a dimming capacitor Cdim and a dimming transistor T6 are connected upstream of the controllable supply current source T4. The dimming capacitor Cdim has its first electrode CdimE1 connected on the input side to the current source T4 and its second electrode CdimE2 connected to the second supply terminal Vss. The dimming transistor T6 has its drain electrode T6A connected to the first electrode CdimE1 of the dimming capacitor Cdim, its control electrode T6S connected to the selection input 4 and its source electrode T6Q connected to the dimming input 7.

The value of the current flow Iled across the LED 2 during the on time ton is preprogrammed by the dimming signal dim via the adjustable supply current source T4. In this context, the dimming signal dim can be programmed via a separate data line (column) and stored in the dimming capacitor Cdim, in contrast to the global dimming signal according to the third embodiment. In one embodiment, multiple (sub)pixels may share such a dimming signal dim or dimming capacitor Cdim. For example, an RGB pixel shares a dimming capacitor Cdim, or a group of RGB pixels share a dimming capacitor Cdim or a data signal dim.

According to a fifth embodiment example, a nominal level of the current flow Iled across the LED 2 (hereinafter referred to as Iled,nominal) is set such that the nominal brightness of the LED 2 is already reached with a duty cycle of less than 100% (cf. FIGS. 9 and 10). In other words, in order to operate, for example, a nominal TFT backplane with a nominal μLED at nominal brightness, an amplitude Iled, nominal is selected so high that the LED 2 is not permanently switched on in terms of time. This means that in light-emitting operation to achieve the nominal brightness of LED 2, the on-time ton,nominal is smaller than the maximum possible on-time ton,max (FIG. 9). This leaves a "buffer" ton,buffer, which can be used to correct LEDs that are too dark (or pixel circuits with too little current) by pulse width modulation to "up" them and thus enable error compensation or white balancing. For example, the ton,buffer corresponds to a portion of the period T of 5%, for example of 10% or of 15%. The maximum on-time ton,max corresponds to the period duration T of the pulse width modulation and thus to a duty cycle 100%.

As shown in FIG. 10, a portion Vprog,buffer above a nominal voltage Vprog,nominal of the voltage Vprog represented by the data signal data can be used to set the duty cycle of the pulse width modulation greater than ton,nominal (i.e., to use ton,buffer) and thereby, for example, make an LED that is too dark brighter.

Alternatively or additionally, in a sixth embodiment, as shown with reference to FIG. 11, calibration can be performed by adjusting the charging current Icharge through the ramp current source T5. The on-time ton (shown dashed) or duty cycle of the pulse width modulation can be increased compared to the nominal on-time ton,nominal by a lower charging current Icharge and a resulting flatter increase of the voltage Vpwm* compared to the ramp signal Vpwm, compared to the ramp signal Vpwm at nominal charging current Icharge,nominal.

Advantageously, in contrast to the fifth embodiment, the calibration according to the sixth embodiment can be achieved by adjusting the duty cycle of the pulse width modulation via the charge current Icharge. Regardless of the strength of the calibration (steepness of the charge curve of the ramp signal Vpwm), for example, an 8-bit resolution of the voltage Vprog represented by the data signal data automatically divides the pulse width modulation into even 8-bit (256) steps. Therefore, the data signal data does not have to be resolved higher than necessary for the pure color resolution.

In summary, according to the fifth and sixth embodiments, a buffer remains for calibration (even towards higher brightness levels) via pulse width modulation when the nominal current level is set such that the pulse width modulation for the nominal brightness of LED 2 does not have 100% on-time tone. The buffer in the on-time can be used for compensation or adjustment purposes. The buffer can be addressed by a so-called overhead of the data signal data or by a change (reduction) of the charge current Icharge of the ramp capacitor Cpwm.

FIG. 12 shows a seventh embodiment of a picture element 1 for a display device 100, which differs from the third embodiment in that the picture element 1 has a set input 8 via which a reference voltage Vset can be provided. Moreover, the controllable supply current source T4 is formed as a first compensation transistor and the ramp current source T5 is formed as a second compensation transistor. A source electrode T4Q of the first compensation transistor is connected to the first supply terminal Vdd, its drain electrode T4A is connected to the source electrode T1Q of the control transistor T1, and its control electrode T4S is connected to the set input 8. A source electrode T5Q of the second compensation transistor is connected to the first supply terminal Vdd, its drain electrode T5A is connected to the source electrode T3Q of the ramp transistor T3, and its control electrode T5S is connected to the set input 8. In particular, the first and second compensation transistors are arranged relative to each other in such a way that extrinsic effects such as ambient temperature have essentially identical effects on the two transistors (indicated by construction unit T45). Moreover, the two transistors can be manufactured in the same production process in order to compensate for intrinsic standard deviations. As an example, the first and second compensation transistors form a current mirror.

In other words, the charging current Icharge is driven by a current source T5 which, in terms of manufacturing tolerance, experiences the same influences as the current source T4, for example due to very close juxtaposition and common gate connection (setting terminal 8). The setting terminal 8 is exemplarily connected to a voltage reference and sets the operating point together with the geometries of the transistor. For example, a width-to-length ratio of the first compensation transistor is 10 while a width-to-length ratio of the second compensation transistor is 1. In this context, it should be noted that the reference voltage Vset is not itself suitable for calibration, since its variation would also compensate as explained above.

If the first compensation transistor T4 has a deviation from the rest of the pixels of the display device 100 (e.g., more current at the same gate voltage), for example, due to layer thickness inaccuracies, the associated second compensation transistor T5 will have this deviation as well (resulting in a higher charge current Icharge).

This deviation is analogously fed back (not discretized) to the ramp capacitor Cpwm, since a higher charge current Icharge results in a steeper charge curve and thus a lower duty cycle, which leads to a reduced brightness of LED 2 and results in an overall compensation of the brightness.

Especially in combination with the fifth or sixth embodiment (ton,nominal<T), this analog compensation can also correct the current flow Iled upwards.

Inaccuracies, which are usually compensated pixel by pixel by white balancing, are partly due to process variations in the manufacture of the TFT backplane, and partly due to variations in the LEDs used. The white correction is usually done by a microcontroller or FPGA, which after measuring the actual brightness determines a correction factor for each (sub-)pixel, which is then used to correct each value of the data signal data. Already due to the digitized correction (i.e. with discretized values) further inaccuracies result, an adjustment is thus never completely possible also because of the limited resolution.

According to the seventh embodiment, however, the error component of the TFT circuit is independently compensated in analog and thus not discretized, so no resolution needs to be provided in the external white balance for this error component. A white balance is therefore only required for an error component of the LEDs. FIG. 13 shows an eighth embodiment example of a picture element 1 for a display device 100, which differs from the third embodiment example in that the picture element has a dimming connection 9 via which a dimming signal Set_I_charge can be provided. Furthermore, the ramp current source T5 is formed as a dimming transistor whose source electrode T5Q is connected to the first supply terminal Vdd, whose control electrode T5S is connected to the dimming terminal 9, and whose drain electrode T5A is connected to the source electrode T3Q of the ramp transistor T3.

A global brightness setting (e.g. dimming) can be made alternatively or in addition to the analog setting of the supply current source T4 (DC, cf. FIG. 6) also by setting the ramp current source T5 and the charge current Icharge, and thus be realized via pulse width modulation. As an example, the adjustment is done here via a voltage as dimming signal Set_I_charge. If only dimming is required globally (and the LEDs 2 are not set above their nominal brightness), no duty cycle overhead (cf. fifth and sixth embodiment example) is necessary.

Calibration may be necessary due to inaccuracies and aging effects in the active circuit components. FIG. 14 shows a ninth embodiment of a picture element 1 for a display device 100, which differs from the eighth embodiment in that the picture element 1 has a calibration input 10 via which a calibration signal data2 can be provided. In addition, the pixel element 1 has a calibration transistor T6 and a calibration capacitor CprogData. The calibration transistor T6 has its source electrode T6Q connected to the calibration input 10, its drain electrode T6A connected to the dimming terminal 9, and its control electrode connected to the source electrode T3Q of the ramp transistor T3. The calibration capacitor CprogData has its first electrode CprogDataE1 connected to the dimming terminal 9 and its second electrode CprogDataE1 connected to the second supply terminal Vss.

Via the charge current Icharge, the duty cycle or pulse width of the current flow Iled via LED 2 can now also be intervened with from an external pixel by connecting the ramp current source T5 of each (sub)pixel to a separate sample-and-hold stage with its own calibration input 10 and supplying it with a separate calibration signal data2. This can be used for white point calibration, for example.

According to a tenth embodiment example, for each picture element 1 of the display device 100, the calibration input 10 according to the ninth embodiment example, which respectively controls the respective slope of the ramp signal Vpwm via the charge current Icharge, is connected or supplied with standard 8-bit data sources (standard ICs). The pulse width modulation can be resolved with a total of 16 bits by using two separate, low-cost "standard" 8-bit data sources.

For pixel-fine (white) calibration, in other words, an 8-bit voltage source is used in this embodiment, whereas a nominal gray level of the (sub)pixel is set via another 8-bit voltage source as usual so that two separate, low-cost standard source-driver ICs can be used.

To realize a white balance, the data signal can alternatively be provided with a large bit overhead, i.e. instead of the standard 8 bit gray level (8 bits per color), the data signal is resolved with 12-14 bits for an exact white balance. However, data sources in standard display driver ICs are only provided with 8 bit resolution. In this context, compared to the above two 8 bit standard source-driver ICs, a more expensive, specially adapted source-driver IC with up to 16 bit accuracy can be used.

FIG. 15 shows an eleventh embodiment of a picture element 1 for a display device 100, which differs from the previous embodiments in that the data signal data is in digital form instead of analog form. The data signal data comprises N data bits, for example 8 bits (only 3 bits shown here for overview reasons). Correspondingly, the picture element 1 has N control units T21, T22, T23 and N data capacitors Cprog1, Cprog2, Cprog3, each forming sample-and-hold units. In this regard, the selection signal scan comprises N pulses or a pulse supplied to the individual control units T21, T22, T23 in synchronization with the individual data bits of the data signal data by delay elements between the individual control units T21, T22, T23. Exemplarily, the display device 100 has a frame rate of 60 Hz at 8 bit grayscale and 1920 columns y, allowing enough time for several such pulses (There is a time frame of 1/60 sec (frame) to "program" 1920 columns as well. Since the programming is done sequentially, 8 CLK cycles are necessary).

The comparison unit has N first inputs 3E1 and is designed as comparator 3 or similar. Depending on the significance of the individual data bits, provision can be made to stagger a capacitance of the data capacitors or to connect a correspondingly staggered multiplier downstream of the inputs (for example within the comparator 3) before the applied voltage is fed to an adder and the result is compared with the ramp signal Vpwm applied to the second input 3E2. FIG. 16 shows a twelfth embodiment of a picture element 1 for a display device 100, which differs from the previous embodiments in that both the data signal data and the ramp signal Vpwm are in digital form instead of analog form. Both the data signal data and the ramp signal Vpwm comprise N data bits, for example 8 bits (only 3 bits shown here for overview reasons). Corresponding to this, the picture element 1 has N comparison elements 31, 32, 33, which are set up for a comparison of individual bits ("bit by bit comparator"), in each case a first input of the comparison elements 31, 32, 33 being fed with the digital data signal data and a second input of the comparison elements 31, 32, 33 being fed with the digital ramp signal Vpwm. Exemplarily, these are comparators, flip-flops or the like. Depending on the significance of the individual data bits, correspondingly staggered multipliers are connected downstream of the outputs of the comparison elements 31, 32, 33 before the generated current is fed to a node. This node is connected on the output side to a unit 13. In addition, a global voltage reference Vref is supplied to unit 13. A capacitor is provided for each input of unit 13, which is charged by the output of the node or the voltage reference Vref and is connected on the output side to a respective input of a further comparison element 34. The PWM signal PWM is then present at the output of the further comparison element 34. The weighted currents of the comparison elements 31, 32, 33 summed up in the node charge, for example, a capacitor in unit 13. When the threshold of the voltage reference Vref is reached, the downstream further comparison element 34 is triggered. The further comparison element 34 is, for example, also a comparator, a flip-flop or the like. A delay element D can be connected upstream of each of the comparison elements 31, 32, 33, by way of example so that the individual data bits of the data signal data and of the ramp signal Vpwm are each supplied to the individual comparison elements 31, 32, 33 synchronously with a pulse of the selection signal scan. As an example, the display device 100 has a frame rate of 60 Hz at 24 bit grayscale and 1920 columns y so that there is enough time for several such pulses: 60 Hz frame rate corresponds to 16 ms, in which the image must be completely built up, i.e. for each horizontal pixel the following time is available: 16 ms/1920 columns (=pixel)/24 bit=0.3 μs (pulse duration/bit) or 0.15 μs on-time at 50% on time/pulse-on time.

In summary, in the above embodiments, the PWM signal PWM is not specified by external programming, but is generated in the individual picture elements 1 corresponding to (sub)pixels of the display device 100. Within the picture element 1, an analog or digital voltage signal can be converted into a digital signal (PWM signal PWM) using TFTs. A microcontroller is merely optional for generating the PWM signal PWM. Optionally, a current level of the individual LEDs can also be adjusted globally or pixel by pixel. Furthermore, calibration of the display device 100 or compensation of inaccuracies of a current source of a pixel is optionally enabled by the generated PWM signal PWM and feedback of the current flow Iled via the LED 2. In particular, the nominal maximum brightness of the LED 2 may be limited to, e.g. 90% and a remaining portion can be used for calibration by controlling the nominal current flow Iled across the LED 2 during the on-time ton via the supply current source T4 and can be fixed or programmed, e.g. via the additional sample-and-hold stage according to the ninth embodiment example (additional calibration capacitor CprogData and additional calibration input 10 per picture element 1) for pixel-specific programming of the analog current level or via a global (or line-by-line or column-by-column) dimming signal according to the third or eighth embodiment example which is applied from the outside for implementing a day/night mode and intermediate stages.

In an advantageous manner, the picture element 1 according to previous embodiments can be used in a usual active matrix structure of a display device 100, in which voltage programming is performed via selection signals scan and data signals data. By using the selection signal scan as an external trigger of the pulse width modulation, supply lines can be saved. In this context, the reset terminal 11 is exemplarily connected to the selection input 4 and the reset signal blank corresponds to the selection signal scan. By generating the pulse width modulation in the picture element 1, no switching on and off of the picture element 1 via programming is required: usually the storage of the analog image information takes place within a holding capacitor of a 2T1C cell. If the pulse width modulation is now also mapped via this holding capacitor and the scan transistor, the data rate increases by 2^N of the desired PWM resolution. Compared to alternatives for generating pulse width modulation, fewer active circuit components are required, allowing integration into a TFT circuit.

The invention is not limited to these by the description based on the embodiments. Rather, the invention encompasses any new feature as well as any combination of features, which in particular includes any combination of features in the patent claims, even if this feature or combination itself is not explicitly stated in the patent claims or embodiments.

LIST OF REFERENCE SIGNS

1 Picture element
1S Unit
B, 2 Semiconductor device/LED
2E1, 2E2 LED electrodes
3 Comparator
4 Select input
scan Select signal
5 Data input
data Data signal

6 Ramp input
Vpwm Ramp signal
7 Dimming input
dim Dimming signal
8 Setting input
Vset, Vref Reference voltage
9 Dim connection
Set_I_charge Dimming signal
10 Calibration input
data2 Calibration signal
11 Reset input
blank Reset signal
3E1, 3E2, 3A Comparator inputs/outputs
A, T1 Supply switch/transistor
T2 Control transistor
T3 Ramp transistor
T4 Supply power source
T5 Ramp power source
T6 Dim transistor
T1S-T6S Control electrode
T1A-T6A Drain electrode
T1Q-T6Q Source electrode
T21, T22, T23 Control units
Cprog, Cprog1, Cprog2, Cprog3 Data capacitors
CprogE1, CprogE2 Capacitor electrodes
Cpwm Ramp capacitor
CpwmE1, CpwmE2 Capacitor electrodes
Cdim Dim capacitor
CdimE1, CdimE2 Capacitor electrodes
CprogData Calibration capacitor
CprogDataE1, CprogDataE2 Capacitor electrodes
D1, D2 Delay elements
100 Display device
Vdd, Vss Supply connection
Iled Current flow
x Rows
y Columns
y1-yn Column lines
x1-xm Row lines
12 Control device
Z1-zn Ramp lines
τ1, τ2,
tone, tone1, tone2, toff Duration
T Period duration
Icharge Charge current
T45 Unit

The invention claimed is:

1. A picture element for a display device, comprising
a first and a second supply terminal,
a light-emitting semiconductor device arranged between the first and the second supply terminal,
a comparison unit having a first and a second input and an output, the comparison unit being configured to adjust a voltage at the output in dependence on a comparison of a voltage applied to the first input and a voltage applied to the second input,
a supply switch configured to control a current flow between the first and the second supply terminal via the light-emitting semiconductor device depending on the voltage applied at the output of the comparison unit,
a selection input and a data input,
a memory element and a control switch which is configured to supply a data signal provided via the data input to the first input of the comparison unit as a function of a selection signal applied to the selection input and to hold the data signal in the memory element, the second input of the comparison unit being configured to receive a ramp signal so that a current flow through the light-emitting semiconductor device can be set as a function of the data signal,
wherein the data signal comprises a predetermined number N of digital data bits, the memory element has a plurality of N data capacitors corresponding to the predetermined number N of digital data bits, and the control switch has a plurality of N control units corresponding to the predetermined number N of digital data bits,
inputs of the plurality of N control units are coupled to the data input,
the plurality of N control units and the plurality of N data capacitors form a plurality of N sample-and-hold units,
outputs of the plurality of N sample-and-hold units are coupled to N terminals of the first input of the comparison unit, and
depending on the significance of the individual data bits, a correspondingly staggered multiplier is connected downstream of the N terminals of the first input within the comparison unit before multiplied voltages are fed to an adder within the comparison unit and the result is compared with the ramp signal applied to the second input of the comparison unit.

2. The picture element according to claim 1, wherein
the light-emitting semiconductor device has a first and a second electrode,
the comparison unit is formed as a comparator,
the supply switch is formed as a supply transistor and the control switch comprises a control transistor, wherein the supply transistor and the control transistor each have a control electrode, a drain electrode and a source electrode, and
the memory element comprises a data capacitor having a first and second electrode, wherein
the supply transistor is coupled to the first supply terminal via its source electrode, to the output of the comparator via its control electrode and to the first electrode of the light-emitting semiconductor device via its drain electrode,
the light-emitting semiconductor device is coupled to the second supply terminal via the second electrode,
the control transistor is coupled via its source electrode to the data input, via its control electrode to the selection input and via its drain electrode to the first input of the comparator and to the first electrode of the data capacitor, and
the second electrode of the data capacitor is coupled to the second supply terminal.

3. The picture element according to claim 1, comprising a ramp input provided for receiving the ramp signal generated externally with respect to the picture element and coupled to the second input of the comparison unit.

4. The picture element according to claim 1, comprising
a reset input provided for receiving a predetermined reset signal,
a ramp capacitor having first and second electrodes, the first electrode being coupled to the second input of the comparator unit and the second electrode being coupled to the second supply terminal,
a ramp current source coupled to the first electrode of the ramp capacitor and configured to charge the ramp capacitor, and
a ramp transistor with a control electrode, a drain electrode and a source electrode, the ramp transistor being coupled via its drain electrode to the second supply terminal, via its control electrode to the reset input and via its source electrode to the first electrode of the ramp capacitor so that, depending on the predetermined reset signal, the ramp capacitor can be discharged and a ramp-like change of the voltage applied to the second input of the comparison unit can be set as a ramp signal.

5. The picture element according to claim 3, comprising a supply current source arranged between the first supply terminal and the supply switch and configured to provide a current for operating the light-emitting semiconductor device.

6. The picture element according to claim 5, comprising a dimming input, wherein the supply current source has a control input which is coupled to the dimming input, and the supply current source is configured to control an amplitude of the current flow between the first and the second supply terminals via the light-emitting semiconductor device as a function of a dimming signal applied to the dimming input.

7. The picture element according to claim 6, comprising a dimming capacitor having a first and a second electrode, the first electrode being coupled to the control input of the supply current source and the second electrode being coupled to the second supply terminal, and a dimming transistor with a control electrode, a drain electrode and a source electrode, the dimming transistor being coupled via its source electrode to the dimming input, via its control electrode to the selection input and via its drain electrode to the first electrode of the dimming capacitor so that the dimming signal can be fed to the control input of the supply current source as a function of the selection signal applied to the selection input and can be held in the dimming capacitor.

8. The picture element according to claim 5, comprising a set input for receiving a reference voltage, wherein the supply current source is formed as a first compensation transistor and the ramp current source is formed as a second compensation transistor, the first and the second compensation transistor each comprising a control electrode, a drain electrode and a source electrode, and the first compensation transistor is coupled to the first supply terminal via its source electrode, to the set input via its control electrode and to the source electrode of a supply transistor via its drain electrode, and the second compensation transistor is coupled to the first supply terminal via its source electrode, to the set input via its control electrode and to the source electrode of the ramp transistor via its drain electrode.

9. The picture element according to claim 4, comprising a dim terminal, wherein the ramp current source is formed as a dimming transistor, the dimming transistor has a control electrode, a drain electrode and a source electrode and is coupled via its source electrode to the first supply terminal, via its control electrode to the dimming terminal and via its drain electrode to the source electrode of the ramp transistor so that a voltage applied to the ramp capacitor for charging the ramp capacitor can be controlled as a function of a dimming signal applied to the dimming terminal.

10. The picture element according to claim 9, comprising a calibration input, a calibration transistor having a control electrode, a drain electrode and a source electrode, the calibration transistor being coupled to the calibration input via its source electrode, to the selection input via its control electrode, and to the dimming terminal via its drain electrode, and a calibration capacitor with a first and second electrode, the calibration capacitor being coupled via its first electrode to the dimming terminal and via its second electrode to the second supply terminal so that a calibration signal applied to the calibration input can be supplied to the dimming terminal depending on the selection signal applied to the selection input and can be held in the calibration capacitor.

11. A display device with a plurality of picture elements according to claim 1, which are arranged in a matrix-like manner in rows and columns, a plurality of column lines, each coupled to the respective selection input of the picture elements of one of the columns, a plurality of row lines, each coupled to the respective data input of the picture elements of one of the rows, a control device coupled to the plurality of column lines and adapted to generate a pulse as a selection signal for a selected one of the plurality of column lines, wherein the control device is coupled to the plurality of row lines and adapted to generate a data signal for a selected row line from the plurality of row lines.

12. The display device according to claim 11, comprising a plurality of ramp lines each coupled to the ramp input of one of the picture elements, the control device being coupled to the plurality of ramp lines and being adapted to generate a ramp signal for the plurality of ramp lines externally with respect to the picture elements.

13. The display device according to claim 12, comprising a plurality of first delay elements, each coupled to column lines of two successive columns and configured to provide the selection signal delayed by a predetermined first time period at the respective second column line compared to the respective first column line, and a plurality of second delay elements, each coupled to ramp lines of two successive columns and configured to provide the ramp signal delayed in each case by a predetermined second time duration at the respective second ramp line in comparison with the respective first ramp line, the predetermined first time duration being in a predetermined ratio to the predetermined second time duration.

14. The display device according to claim 11, comprising a plurality of reset lines each coupled to the reset input of one of the picture elements, the control device being coupled to the plurality of reset lines and adapted to generate a pulse as a predetermined reset signal for a selected one of the plurality of reset lines.

15. The display device according to claim 11, comprising a plurality of first dimming lines, each coupled to the dimming input of one of the picture elements or to the dimming input of one of the picture elements of a row or column of the display device or to the dimming input of one of the picture elements of an RGB triplet of the display device, wherein the control device is coupled to the plurality of first dimming lines and is adapted to generate a first dimming signal for a selected first dimming line out of the plurality of first dimming lines.

16. The display device according to claim 11, comprising a plurality of second dimming lines each coupled to a dimming terminal of one of the picture elements, the control device being coupled to the plurality of second dimming lines and adapted to generate a second dimming signal for a selected second dimming line from the plurality of second dimming lines.

17. The display device according to claim 11, comprising a plurality of setting lines each coupled to the setting input of one of the picture elements, and a reference voltage source coupled to the plurality of setting lines and adapted to provide a reference voltage for the plurality of setting lines, and/or a plurality of calibration lines each coupled to the calibration input of one of the picture elements, the control device being coupled to the plurality of calibration lines and adapted to generate a calibration signal for a selected calibration line from the plurality of calibration lines.

* * * * *